US007139979B2

(12) United States Patent
Schultz et al.

(10) Patent No.: US 7,139,979 B2

(45) Date of Patent: Nov. 21, 2006

(54) DISPLAYING OPERATIONS IN AN APPLICATION USING A GRAPHICAL PROGRAMMING REPRESENTATION

(75) Inventors: Kevin L. Schultz, Georgetown, TX (US); Nicolas Vazquez, Austin, TX (US)

(73) Assignee: National Instruments Corporation, Austin, TX (US)

(*) Notice: Subject to any disclaimer, the term of this patent is extended or adjusted under 35 U.S.C. 154(b) by 736 days.

(21) Appl. No.: 10/166,405

(22) Filed: Jun. 10, 2002

(65) Prior Publication Data

US 2003/0227483 A1 Dec. 11, 2003

(51) Int. Cl.
*G06F 3/00* (2006.01)
*G06F 3/048* (2006.01)

(52) U.S. Cl. ...................................... 715/763; 715/771

(58) Field of Classification Search ................ 717/104; 715/771, 763
See application file for complete search history.

(56) References Cited

U.S. PATENT DOCUMENTS

| | | | |
|---|---|---|---|
| 4,831,580 A | 5/1989 | Yamada | |
| 5,005,119 A | 4/1991 | Rumbaugh et al. | |
| 5,481,712 A | 1/1996 | Silver et al. | |
| 5,481,741 A | 1/1996 | McKaskle et al. | |
| 5,576,946 A * | 11/1996 | Bender et al. | 700/17 |
| 5,623,592 A * | 4/1997 | Carlson et al. | 715/866 |
| 5,742,504 A | 4/1998 | Meyer et al. | |
| 5,911,070 A | 6/1999 | Solton et al. | |
| 5,940,296 A | 8/1999 | Meyer | |
| 5,946,485 A | 8/1999 | Weeren et al. | |
| 5,966,532 A | 10/1999 | McDonald et al. | |
| 6,053,951 A | 4/2000 | McDonald et al. | |
| 6,219,628 B1 * | 4/2001 | Kodosky et al. | 703/2 |
| 6,298,474 B1 * | 10/2001 | Blowers et al. | 717/104 |
| 6,331,864 B1 | 12/2001 | Coco et al. | |
| 6,366,300 B1 | 4/2002 | Ohara et al. | |
| 6,408,429 B1 * | 6/2002 | Marrion et al. | 717/100 |
| 6,437,805 B1 | 8/2002 | Sojoodi et al. | |
| 6,453,464 B1 | 9/2002 | Sullivan | |
| 6,493,003 B1 | 12/2002 | Martinez | |
| 6,571,133 B1 * | 5/2003 | Mandl et al. | 700/18 |
| 6,584,601 B1 * | 6/2003 | Kodosky et al. | 716/4 |
| 6,608,638 B1 * | 8/2003 | Kodosky et al. | 715/771 |
| 6,637,022 B1 | 10/2003 | Weeren et al. | |
| 6,763,515 B1 * | 7/2004 | Vazquez et al. | 717/109 |

(Continued)

FOREIGN PATENT DOCUMENTS

| | | |
|---|---|---|
| EP | 1077404 | 2/2001 |

OTHER PUBLICATIONS

Advanced Imaging, Special Report: Imaging and the Macintosh/Robust Image Databases, Apr. 1991, pp. 18-32.

(Continued)

*Primary Examiner*—Weilun Lo
*Assistant Examiner*—Steven Theriault
(74) *Attorney, Agent, or Firm*—Meyertons Hood Kivlin Kowert & Goetzel, P.C.; Jeffrey C. Hood; Jason L. Burgess

(57) ABSTRACT

Operations in an application may be displayed using a graphical programming representation. A plurality of interconnected icons may be displayed, where each icon corresponds to an operation included in the application. The plurality of interconnected icons may visually indicate a function implemented by operations in the application. Each displayed icon may correspond to a node in a graphical programming development environment.

111 Claims, 13 Drawing Sheets

U.S. PATENT DOCUMENTS

| | | | | |
|---|---|---|---|---|
| 6,784,903 | B1 * | 8/2004 | Kodosky et al. | 715/771 |
| 6,892,361 | B1 * | 5/2005 | Kandogan | 715/837 |
| 6,912,428 | B1 * | 6/2005 | Nakai et al. | 700/18 |
| 6,971,066 | B1 * | 11/2005 | Schultz et al. | 715/771 |
| 7,000,190 | B1 * | 2/2006 | Kudukoli et al. | 715/763 |
| 2001/0020291 | A1 | 9/2001 | Kudukoli et al. | |
| 2001/0035879 | A1 | 11/2001 | Washington et al. | |
| 2002/0083413 | A1 | 6/2002 | Kodosky et al. | |
| 2002/0089538 | A1 | 7/2002 | Wenzel et al. | |
| 2002/0129333 | A1 | 9/2002 | Chandhoke et al. | |
| 2004/0034696 | A1 | 2/2004 | Joffrain et al. | |
| 2004/0034847 | A1 | 2/2004 | Joffrain et al. | |
| 2005/0028138 | A1 | 2/2005 | Case et al. | |
| 2005/0091602 | A1 | 4/2005 | Ramamoorthy et al. | |

OTHER PUBLICATIONS

Optilab Image Processing and Analysis Software for the Apple Macintosh ™ II, User's Manual, dated 1990.

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

Automatix News Release, www.applefritter.com/macclones/automatix/newsrelease, Vision for Process Feedback and Control, Jul. 3, 2000, pp. 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

US 6,094,526, Jun. 25, 2000, Marrion et al. (withdrawn).

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

"IMAQ Vision Builder Tutorial," National Instruments , Jan. 1999.

"Object Pallet for Visual Code Generation"; IBM Technical Disclosure Bulletin; Jan. 1, 1995; pp. 19-20; vol. 38, Issue 1.

"Vectored Visual Programming"; IBM Technical Disclosure Bulletin; Aug. 1, 1994; pp. 367-370; vol. 37, Issue 8.

* cited by examiner

DISPLAYING OPERATIONS IN AN APPLICATION USING A GRAPHICAL PROGRAMMING REPRESENTATION

FIELD OF THE INVENTION

The present invention relates to the fields of software prototyping environments and graphical programming. More particularly, the invention relates to displaying operations in an application by using a graphical programming visual representation. One embodiment of the invention relates to displaying machine vision operations in an application by using a graphical programming visual representation, where the machine vision operations implement a machine vision function.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "progam." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming development environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, image processing/machine vision applications, and motion control, among others.

As new techniques and computerized methods are developed for a given problem domain, specialized software applications for developing solutions to problems in that domain are often created. These specialized applications can provide an environment that is conducive to rapidly and conveniently prototyping a problem solution. Hence, these applications are also referred to herein as "prototyping environments". A prototyping environment may integrate various capabilities to aid developers of problem solutions. For example, a prototyping environment may provide a library of operations that are specific to one or more problem domains and may enable a user to select various operations from the library for inclusion in an application. Prior art prototyping environments have used various techniques to display the operations in the application, such as using text information arranged in various ways, such as a table or tree view.

SUMMARY

One embodiment of the invention relates to displaying operations in an application by using a graphical programming representation (or block diagram representation). A plurality of operations may be included in the application, e.g., in response to user input received to a graphical user interface of a prototyping environment. A plurality of interconnected icons may be automatically (i.e., programmatically) displayed in response to including the plurality of operations in the application. Each icon may correspond to an operation included in the application.

In one embodiment, as each operation is added to the application, a corresponding icon may be displayed and may be visually interconnected to one or more other icons that may have been previously displayed. Each icon may be designed to represent the respective operation using an intuitive picture. The plurality of interconnected icons may visually indicate the first function implemented by the plurality of operations in the application. In one embodiment, as each operation is added to the application, the respective operation may also optionally be displayed in a graphical user interface of the application development environment.

Thus, when the user adds a first operation to the application, a corresponding first icon may be displayed representing the first operation. In addition, a name or other indicia of the respective first operation may optionally be displayed in a graphical user interface of the application development environment. When the user adds a second operation to the application, a corresponding second icon may then be displayed representing the second operation. In addition, a name or other indicia of the respective second operation may be displayed in the graphical user interface of the application development environment. The second icon may be automatically connected to the first icon to indicate the sequence of operations. The above process repeats, where new icons are added to the block diagram representation (and connected with already displayed icons) as the user adds operations to the application.

As noted above, the system may display interconnecting lines between displayed icons, where each line connects two (or more) icons. The lines may have various meanings or semantics. For example, where the plurality of lines includes a first line that connects a first icon to a second icon, the first line may indicate that performing the first function includes performing the operation corresponding to the first icon before performing the operation corresponding to the second icon. In another embodiment, the first line may indicate that data produced by the operation corresponding to the first icon is used by the operation corresponding to the second icon (data flow). In various embodiments, the interconnection lines or links may visually represent one or more of data flow, control flow, and/or execution flow for the plurality of operations in the application. Thus, the plurality of interconnected icons may be referred to as a graphical programming visual representation (or a block diagram representation) of the plurality of operations in the application. The icons may be displayed in various ways, e.g., in a left-to-right manner or top-to-bottom manner, to visually represent an ordering of the operations or to visually represent other relationships among the operations.

The plurality of operations may implement a first function. In various embodiments the plurality of operations in the application may implement any of various functions or solutions. As one example, the plurality of operations may include one or more machine vision operations that implement a machine vision function, such as for acquiring and/or analyzing images. As another example, the plurality of operations may include one or more motion control operations that implement a motion control function, such as for controlling motion of a device and/or controlling a device to move an object. As another example, the plurality of operations may include one or more data acquisition (DAQ) operations that implement a DAQ function, such as for acquiring measurement data from a device.

In one embodiment, the user may perform operations on a displayed image or object (e.g., an image of an object displayed on the display), and this may cause the operations to be stored in the application. The object may also be updated on the display to reflect the operations performed. The system may display a graphical user interface with various menus, dialogs, controls or other GUI elements that the user may use to apply operations to an image. As the user performs each respective operation on the object, a corresponding icon may be displayed to visually represent the operation. Thus, as the user performs each additional operation on the object, a corresponding icon may be immediately displayed to visually represent this operation, and the newly displayed icon may be interconnected with one or more other existing icons. Thus, as noted above, the system may also display a connection between a newly displayed icon and a previously displayed icon to represent their relationship.

In an embodiment targeted toward machine vision, the system may display an image. The system may also display a graphical user interface that may be used by the user to apply various operations (e.g., image processing or machine vision operations) to the displayed image. The user may use the GUI to perform operations on the displayed image, may draw regions of interest (ROIs) on the image, etc. These actions by the user may cause visual changes to the image according to the operation performed. As the user performs machine vision operations on the displayed image, the machine vision operations may be included or stored in the application, and a corresponding icon may also be displayed to visually represent the machine vision operation. Thus, in one embodiment, as the user performs each operation to the image, 1) the operation is stored in memory, 2) the image is changed according to the operation, 3) a new icon is displayed in the block diagram representation, where the new icon represents the operation, and 4) the new icon may be connected with a pre-existing icon (assuming the new icon does not represent the first operation). The operation may also be displayed in an alternative form in the GUI, such as the textual name of the operation being displayed in a script window.

In one embodiment, each displayed icon may correspond to a node in a graphical programming development environment. In other words, for each operation provided by the prototyping environment, there may be an equivalent node in the graphical programming development environment. Each of these nodes in the graphical programming development environment may have an iconic appearance that is identical to or substantially the same as the corresponding icon.

Information representing the application may be stored, e.g., in a data structure or file. The stored information may include information specifying the plurality of operations in the application. For example, the data structure or file may store names or other identifiers that identify the operations in the application. The data structure or file may also store information regarding various properties or parameter values configured for one or more operations in the application.

In one embodiment, each operation may be executed as the operation is included in the application. In another embodiment, the entire application may be executed together. Executing the application may include executing the plurality of operations in the application to perform the first function.

Also, in one embodiment the prototyping environment may be operable to programmatically (automatically) generate a graphical program based on the application, where the graphical program is operable to perform the first function. The generated graphical program may appear the same as or substantially the same as the displayed plurality of interconnected icons. The graphical program may then be executed to perform the first function. In another embodiment, the displayed graphical programming representation (or block diagram representation) is itself an executable graphical program that the user may run, use execution highlighting with, etc.

BRIEF DESCRIPTION OF THE DRAWINGS

A better understanding of the present invention can be obtained when the following detailed description of the preferred embodiment is considered in conjunction with the following drawings, in which.

Figure 1:
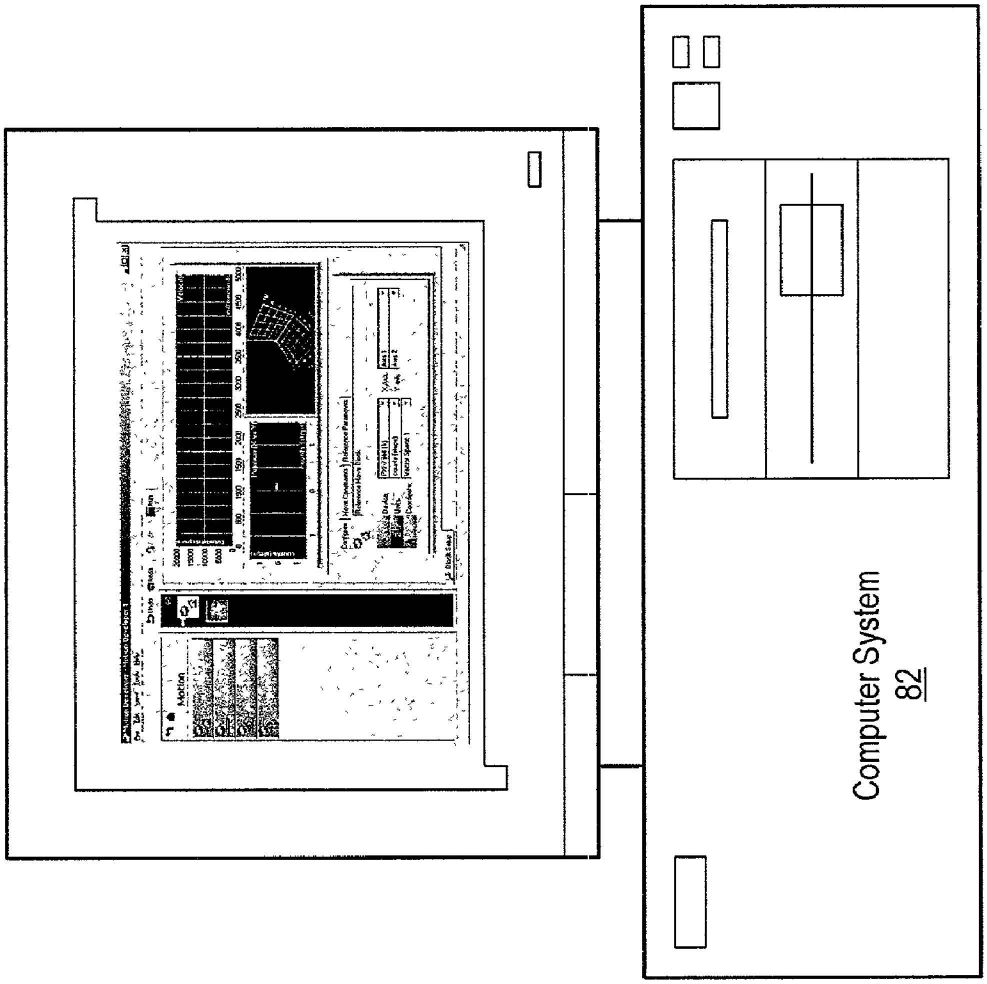
FIG. 1 illustrates a computer system that may execute a prototyping environment application for developing an application including a plurality of operations.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended

DETAILED DESCRIPTION

Incorporation by Reference

The following references are hereby incorporated by reference in their entirety as though fully and completely set forth herein.

U.S. patent application Ser. No. 09/518,492 titled "System and Method for Programmatically Creating a Graphical Program," filed Mar. 3, 2000.

U.S. patent application Ser. No. 09/745,023 titled "System and Method for Programmatically Generating a Graphical Program in Response to Program Information," filed Dec. 20, 2000.

U.S. patent application Ser. No. 09/587,682 titled "System and Method for Automatically Generating a Graphical Program to Perform an Image Processing Algorithm," filed Jun. 6, 2000.

U.S. patent application Ser. No. 09/595,003 titled "System and Method for Automatically Generating a Graphical Program to Implement a Prototype," filed Jun. 13, 2000.

U.S. patent application Ser. No. 10/051,474 titled "System and Method for Graphically Creating a Sequence of Motion Control Operations," filed Jan. 18, 2002.

FIG. 1—Computer System Executing a Prototyping Environment

Knowledge of computer-implemented techniques for solving problems in a wide array of fields is expanding at a rapid pace. As new techniques and computerized methods are developed for a given problem domain, specialized software programs for developing solutions to problems in that domain are often created. These specialized software programs can provide an environment that is conducive to rapidly and conveniently prototyping a problem solution (or "application"). Hence, these programs are also referred to herein as "prototyping environments".

FIG. 1 illustrates a computer system 82. The computer system 82 may execute a prototyping environment application for creating an application. A prototyping environment may integrate various capabilities to aid a user in developing problem solutions, depending on the particular problem domain. For example, a prototyping environment may provide a library of operations that are specific to a problem domain and may enable the user to select various operations from the library for inclusion in the application. The prototyping environment may include a graphical user interface that is streamlined for interactively experimenting with various parameters or properties associated with the selected operations and seeing the effects of adjusting the parameters. A prototyping environment may also include capabilities for simulating real-world objects or processes.

As used herein, the term "application" refers to the result that may be produced by such a prototyping environment. In other words, the term "application" refers to a set of operations, and possibly associated parameters, that may be selected by the user using a prototyping environment. The term "application" is intended to encompass a sequence, solution, prototype, algorithm, script, or similar concept. Thus, a prototyping environment may be used to generate an application which represents an algorithm or process designed by the user in the prototyping environment.

Prototyping environments are usually designed for ease of use and may be specialized for developing solutions for a particular problem domain. They may enable users to create a computer-implemented solution to a problem without requiring the users to utilize or understand traditional programming techniques. For example, the prototyping environment may aid the user in creating an application including a plurality of operations, without requiring the user to write programming language code. Instead of writing code, the user may interact at a higher level with the graphical user interface of the prototyping environment to create the application.

As described below, according to one embodiment of the present invention, the prototyping environment may be operable to display the operations included in the application by using a graphical programming visual representation of the operations and their relationship with each other. For example, a plurality of interconnected icons may be displayed in response to including operations in the application. Each icon may correspond to an operation in the application, so that the plurality of interconnected icons visually indicates a function or process performed by the operations. As each operation is added to the application, a corresponding icon may be immediately visually displayed in the graphical programming visual representation (or block diagram representation).

Prototyping environments may be developed for many different problem domains. Various exemplary prototyping environments are mentioned herein. One example is a motion control prototyping environment application for developing a sequence of motion control operations. A motion control sequence is also referred to herein as a motion control "application".

Computer-based motion control involves precisely controlling the movement of a device or system. Computer-based motion control is widely used in many different types of applications, including applications in the fields of industrial automation, process control, test and measurement automation, robotics, and integrated machine vision, among others. A typical computer-based motion system includes components such as the moving mechanical device(s), a motor with feedback and motion I/O, a motor drive unit, a motion controller, and software to interact with the motion controller.

A motion control prototyping environment may be designed to enable a user to easily and efficiently develop/application a motion control sequence or application without requiring the user to perform programming, e.g., without needing to write or construct code in any programming language. For example, the environment may provide a graphical user interface (GUI) enabling the user to develop/application the motion control sequence at a high level, by selecting from and configuring a sequence of motion control operations using the GUI. According to one embodiment of the present invention, the motion control prototyping environment may be operable to display the motion control operations included in the motion control sequence by using a graphical programming visual representation of the motion control operations and their relationship with each other.

Another example of a prototyping environment described herein is a machine vision prototyping environment. A machine vision prototyping environment may enable a user to rapidly develop an application including a plurality of machine vision operations. As used herein, the term "machine vision operation" may include any of various types of operations related to image analysis, image processing, image acquisition, or other machine vision-related operations. A machine vision application may specify a sequence, script, process, or algorithm for a machine vision application. For example, the machine vision prototyping environment may include a graphical user interface enabling the user to easily apply various machine vision operations to an image and see the results, in order to develop the desired machine vision application.

In various embodiments, any of various types of machine vision operations may be supported, including image acquisition functions, filtering functions, morphology functions, histogram functions, particle analysis functions, edge detection functions, pattern matching functions, color matching functions, shape matching functions, optical character recognition (OCR), optical character verification (OCV), and 1D and 2D barcodes, etc. In one embodiment, the user may apply various machine vision operations to an image, and the operations may be included in the machine vision application. For example, each operation may be recorded as a step in a script. A script may essentially specify an algorithm; i.e., an algorithm may be defined by the plurality of steps or operations in a script. The user may create the machine vision application without specifying or writing programming language code, similarly as described above. According to one embodiment of the present invention, the machine vision prototyping environment may be operable to display the machine vision operations included in a machine vision application by using a graphical programming visual representation of the machine vision operations and their relationship with each other.

In various embodiments, the computer system 82 may execute a prototyping environment application for developing applications related to any of various other types of applications, in addition to motion control and/or machine vision. In general, a "prototyping environment" may refer to a specialized application that provides an environment that is conducive to rapidly and conveniently prototyping a problem solution, preferably without requiring the user to write code in a programming language or minimizing the amount of code the user would otherwise have to write. Other examples of prototyping environments include:

- an instrumentation environment for interacting with hardware instruments, e.g., in order to initialize an instrument, acquire data from the instrument, analyze the acquired data, etc.
- a circuit design environment for developing and testing circuit designs
- a sound processing environment for applying various audio operations to a sound clip, e.g., in order to analyze the sound clip, eliminate background noise, etc.

In various embodiments, the operations in any of various types of applications may be displayed by using a graphical programming visual representation. As a few examples, the application may be related to fields such as image processing, image analysis, machine vision, process control, automation, test and measurement, simulation, motion control, robotics, audio, video, graphics, telecommunications, and workflow processes, among others.

It is noted that a prototyping environment may also enable a user to develop an application which includes operations related to multiple different fields or technologies. For example, one embodiment of a prototyping environment may provide a library of operations including one or more machine vision operations, one or more motion control operations, and one or more data acquisition (DAQ) operations. In this example, the motion control prototyping environment may be referred to as a MC/MV/DAQ prototyping environment. (The abbreviation "MC/MV/DAQ" is used herein to refer to "motion control/machine vision/DAQ".) For example, a MC/MV/DAQ prototyping environment may be used to create an application including machine vision operations for acquiring and analyzing images of an object, motion control operations for moving the object, and DAQ operations for acquiring measurement data of the object. Such an application may be useful, for example, to specify an automated inspection process performed on manufactured objects.

Referring again to FIG. 1, the computer system 82 may be any type of computer system, including a personal computer system, mainframe computer system, workstation, network appliance, Internet appliance, personal digital assistant (PDA), television system, smart camera (or other type of smart sensor), smart motion controller, or other device. In general, the term "computer system" can be broadly defined to encompass any device having at least one processor that executes instructions from a memory medium.

The computer system 82 may include a memory medium(s) on which one or more computer programs or software components may be stored according to one embodiment of the present invention. For example, the memory medium may store a prototyping environment application program (or portion of such an application program) such as described above. The memory medium may also store one or more applications created using the prototyping environment application. The memory medium may also store a graphical program automatically generated by the prototyping environment application based on an application, as described below. The memory medium may also store a graphical programming development environment with which a generated graphical program is associated. The memory medium may also store operating system software, as well as other software for operation of the computer system 82.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Figure 2A:
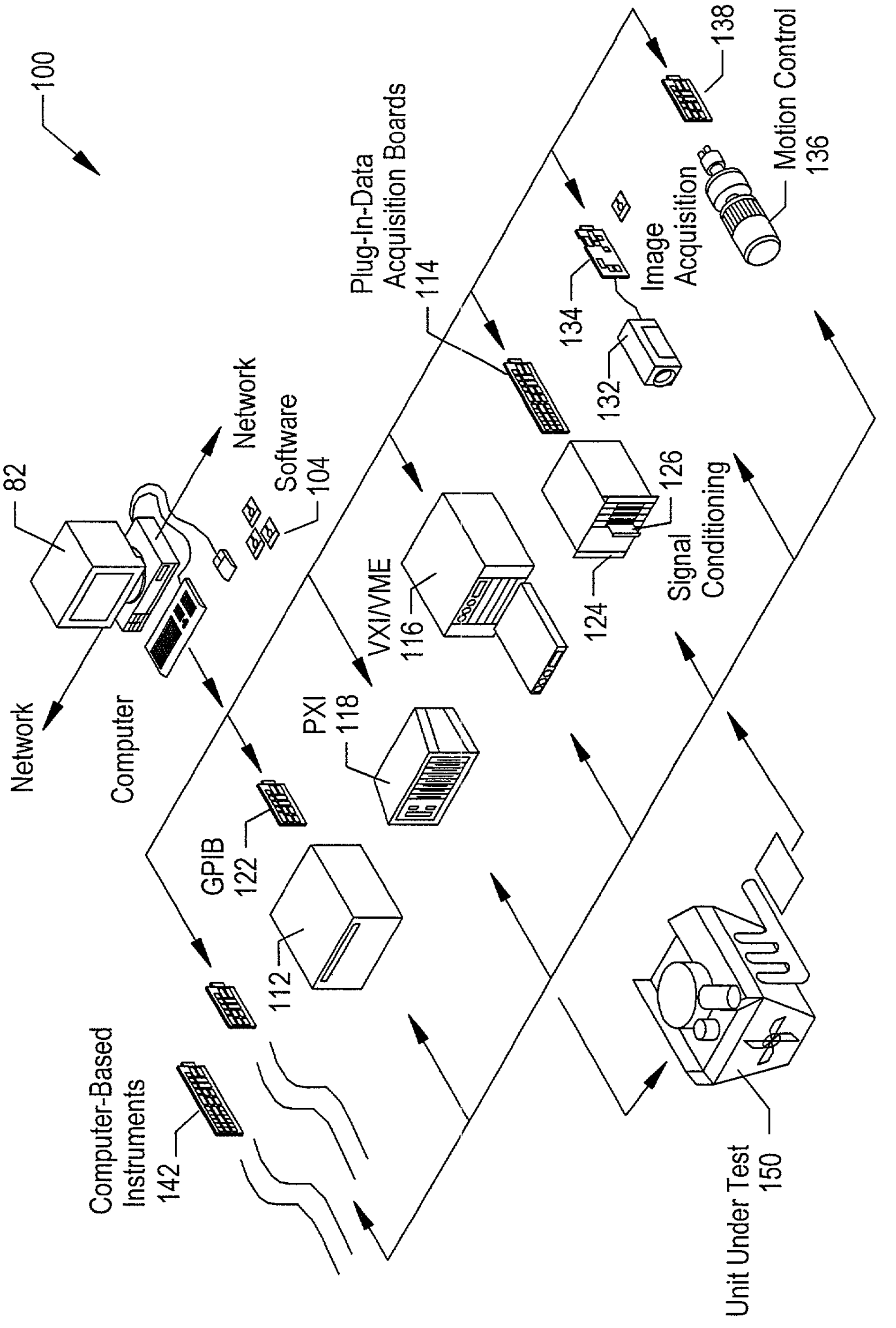
FIGS. 2A and 2B illustrate representative instrumentation and process control systems including various I/O interface options.
Figure 2B:
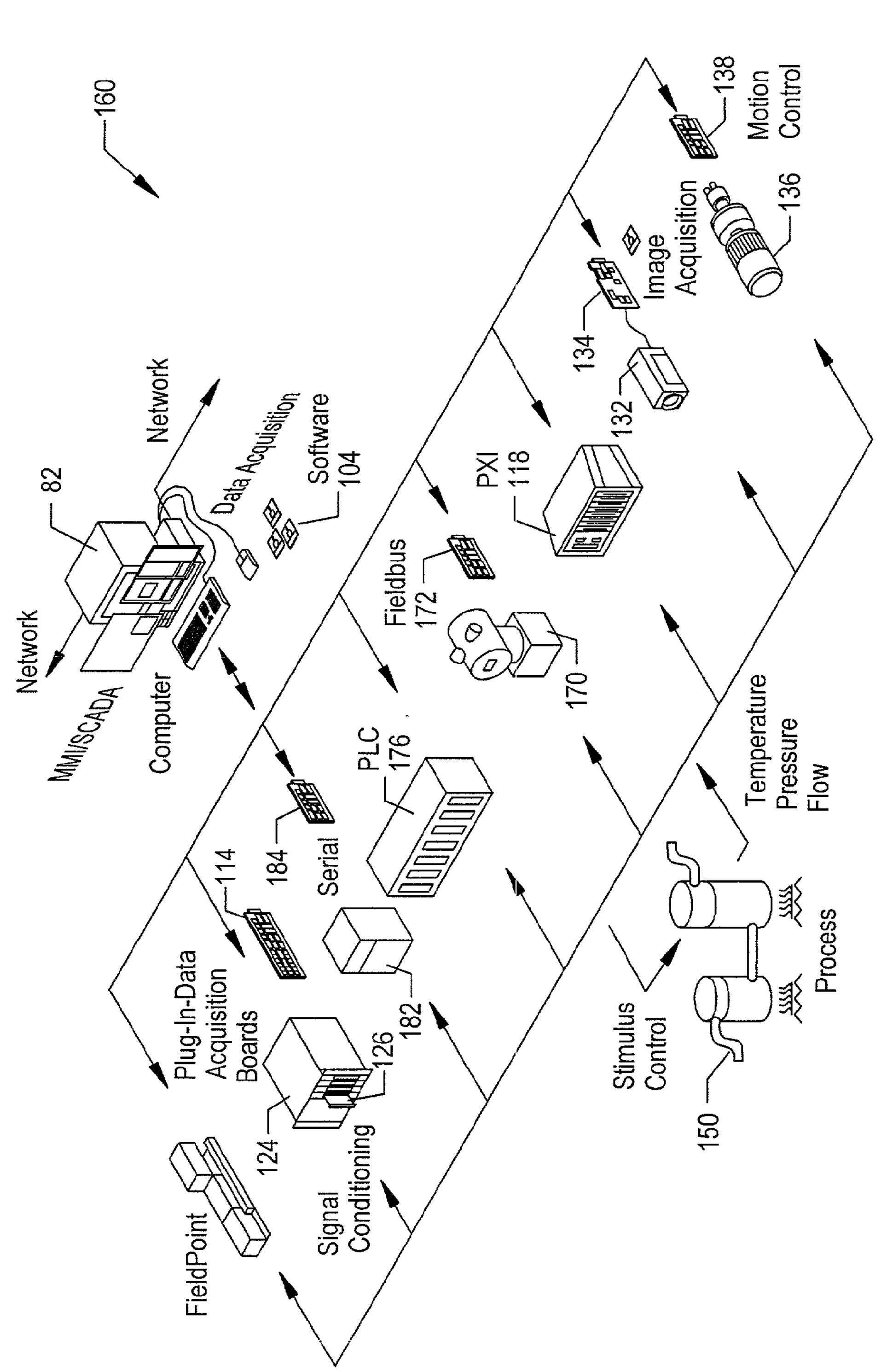

FIGS. 2A and 2B—Instrumentation and Industrial Automation Systems

FIGS. 2A and 2B illustrate embodiments involved with performing test and/or measurement functions and/or controlling and/or modeling instrumentation or industrial automation hardware. However, it is noted that the present invention can be used for a plethora of applications and is not limited to instrumentation or industrial automation applications. In other words, the following description is exemplary only, and the present invention may be used in any of various types of systems.

FIG. 2A illustrates an instrumentation control system 100. The system 100 includes a host computer 82 that connects to one or more instruments. The host computer 82 includes a CPU, a display screen, memory, and one or more input devices such as a mouse or keyboard as shown. The computer 82 may connect through the one or more instruments to analyze, measure, or control a unit under test (UUT) or process 150.

In one embodiment, the host computer 82 may store a prototyping environment application operable to create an application including operations that interact with or control the one or more instruments. As described below, the prototyping environment application may be operable to display the operations in the application by using a graphical programming visual representation of the operations and their relationship with each other. In one embodiment, the host computer 82 may store an application created by the prototyping environment application and/or may execute the application to interact with or control the one or more instruments. In another embodiment, the host computer 82 may store a graphical program based on an application. For example, as described below, the graphical program may be programmatically (automatically) generated based on the application. In this instance, the host computer 82 may execute the graphical program to interact with or control the one or more instruments.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 82 via the GPIB interface card 122 provided by the computer 82. In a similar manner, the video device 132 is coupled to the computer 82 via the image acquisition card 134, and the motion control device 136 is coupled to the computer 82 through the motion control interface card 138. The data acquisition board 114 is coupled to the computer 82, and may interface through signal conditioning circuitry 124 to the UUT. The signal conditioning circuitry 124 preferably comprises an SCM (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or MicroChannel bus slot provided by the computer 82. However, these cards 122, 134, 138 and 114 are shown external to computer 82 for illustrative purposes.

The VXI chassis or instrument 116 is coupled to the computer 82 via a VXI bus, MXI bus, or other serial or parallel bus provided by the computer 82. The computer 82 preferably includes VXI interface logic, such as a VXI, MXI or GPIB interface card (not shown), which interfaces to the VXI chassis 116. The PXI chassis or instrument is preferably coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 includes a computer 82 that connects to one or more devices or instruments. The computer 82 includes a CPU, a display screen, memory, and one or more input devices such as a mouse or keyboard as shown. The computer 82 may connect through the one or more devices to a process or device 150 to perform an automation function, such as MM (Man Machine Interface), SCADA (Supervisory Control and Data Acquisition), portable or distributed data acquisition, process control, advanced analysis, or other control.

In one embodiment, the host computer 82 may store a prototyping environment application operable to create an application including operations involved with the automation function performed by the automation system 160. As described below, the prototyping environment application may be operable to display the operations in the application by using a graphical programming visual representation of the operations and their relationship with each other. In one embodiment, the host computer 82 may store an application created by the prototyping environment application and/or may execute the application to perform the automation function. In another embodiment, the host computer 82 may store a graphical program based on an application. For example, as described below, the graphical program may be programmatically (automatically) generated based on the application. In this instance, the host computer 82 may execute the graphical program to perform the automation function.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 82 as described above. The serial instrument 182 is coupled to the computer 82 through a serial interface card 184, or through a serial port, such as an RS-232 port, provided by the computer 82. The PLC 176 couples to the computer 82 through a serial port, Ethernet port, or a proprietary interface. The fieldbus interface card 172 is preferably comprised in the computer 82 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices are coupled to the device or process 150.

Figure 3:
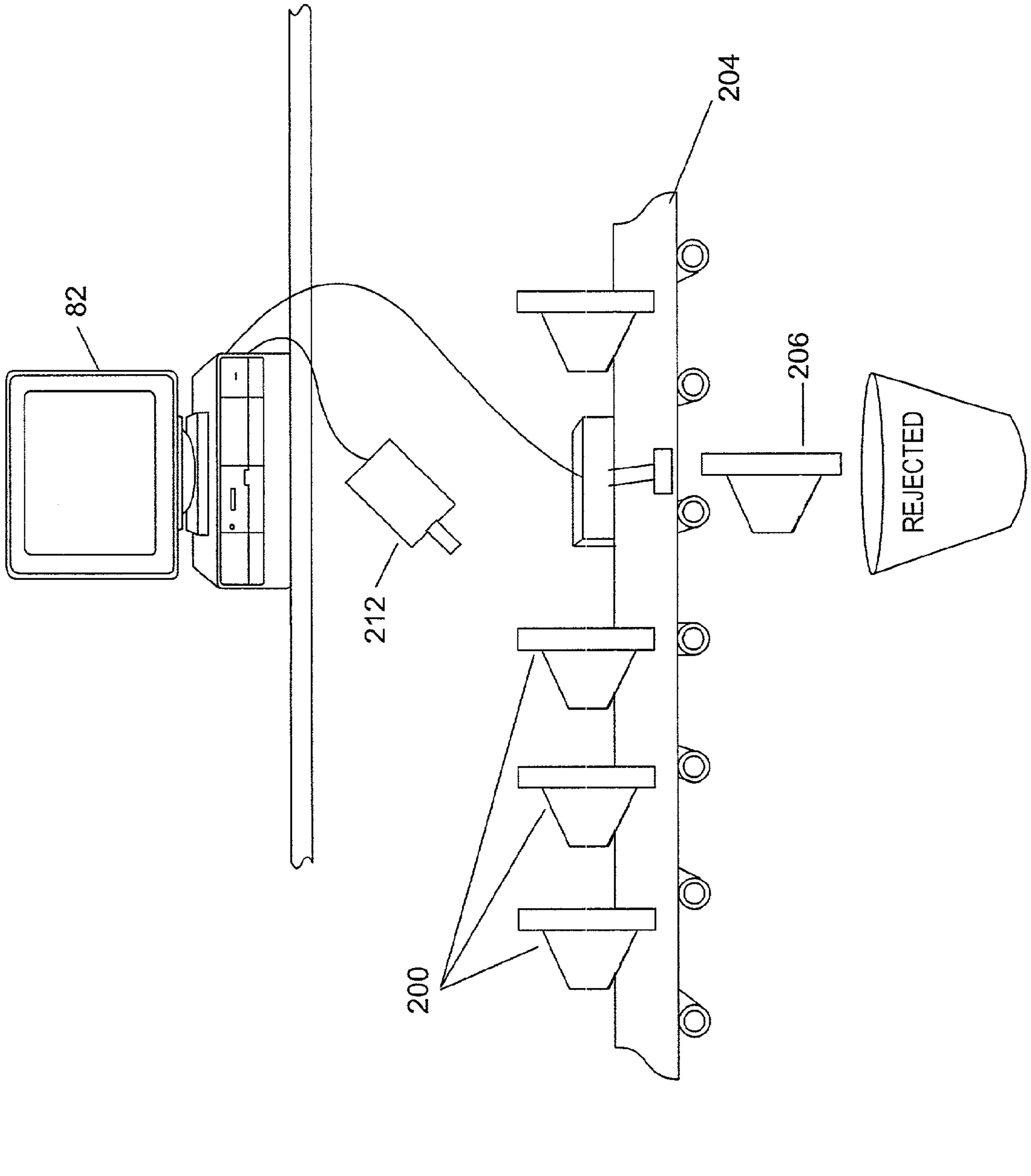
FIG. 3 illustrates one embodiment of a machine vision inspection system.

FIG. 3—Machine Vision Inspection System

FIG. 3 is a diagram illustrating one embodiment of a machine vision inspection system (also referred to as an image acquisition and analysis system) for inspecting objects 200. In FIG. 3, the objects 200 are shown in the form of display devices. However, in various embodiments, the objects 200 may have any of various types of shapes and sizes and may include any kind of objects, devices, or products.

FIG. 3 illustrates a plurality of objects 200 that move along a manufacturing apparatus 204. The system includes one or more cameras 212 operable to acquire images of the objects 200 as they move along the manufacturing apparatus 204. In another embodiment, the objects may not move along a manufacturing apparatus 204. For example, the system may be utilized to acquire and analyze images of a single object 200, or the objects 200 may be placed in front of the camera 212 in a stationary manner. In various embodiments, any number of cameras 212 may be used. The camera(s) 212 may include any type of camera or device operable to acquire images of the objects 200.

As shown in FIG. 3, the camera 212 may be connected to a computer system 82, which is operable to receive the images acquired by the camera. In another embodiment, the computer system 82 may receive images acquired from multiple cameras. For example, the computer system 82 may include one or more image acquisition boards, each for capturing one or more images. The computer system 82 may then analyze the images captured by the image acquisition board(s). Alternatively, the image acquisition board(s) may include on-board processors and memory for performing a portion or all of the image analysis.

In various embodiments, the images of the objects 200 may be analyzed in any of various ways, e.g., may be analyzed for any of various kinds of characteristics or defects, using any of various machine vision or image processing techniques. As a few examples, an image of an object may be analyzed to detect: physical surface defects (scratches, etc.); one or more components located correctly on the object; a correct label on the object; a correct marking on the object; correct color information on the object, etc.

The results of the image analyses may be used to determine whether an object 200 meets desired production standards. The determination may be made based on any of various criteria, as desired for a particular application. If separate computer systems are used to analyze the images, the results from each computer system may be considered together in making this determination. If an object does not meet the desired production standards, the object may be rejected. For example, in rejecting the object, the object may be removed from the manufacturing apparatus 204, as indicated in FIG. 3 by the rejected object 206, and/or the system may store information indicating that the object 206 failed the inspection. Also, images of the rejected object may be stored if desired.

The computer system 82 may be a computer system of any type. In one embodiment, multiple computer systems 82 may be employed, e.g., to distribute the image processing load across multiple computer systems. In one embodiment, the computer system(s) 82 may comprise a controller or card (a "computer on a card") housed in a PXI, VXI or other type of chassis. The chassis may further include one or more image acquisition boards which couple to one or more cameras 212.

The computer system(s) 82 may include a memory medium on which software operable to receive and analyze the images of the objects 200 is stored. In one embodiment, this software may include a machine vision application and/or a machine vision prototyping application used to create and execute the machine vision application. In another embodiment, this software may include a program that was programmatically generated based on a machine vision application, such as a graphical program or a text-based program. It is noted that in various embodiments, the analysis of the objects 200 may be performed in any of various manners, either in software, programmable logic, or hardware, or a combination thereof. For example, at least a portion of a machine vision application may be deployed on a hardware device.

Although FIG. 3 illustrates a machine vision inspection system and machine vision-related tests are discussed above, in other embodiments the computer system 82 may be operable to perform other types of tests of an object 200, including audio tests (e.g., to test function or quality of an audio component of the object), shock tests or noise-vibration-harshness (NVH) tests, mechanical tests (e.g., to test function or quality of a mechanical component of the object), battery tests (e.g., to test function or quality of a battery of the object), and/or current draw or other electrical tests (e.g., to test current draw or other electrical characteristics or RF parameters of the object), among other types of tests. For example, a prototyping environment may provide access to operations related to performing these types of tests, and the user may include the desired operations in an application. As described below, the operations in the application may be displayed to the user using a graphical programming visual representation. As noted above, in other embodiments, the application may be intended for any of various other applications in addition to inspecting objects 200. Thus, FIG. 3 is exemplary only.

Figure 4:
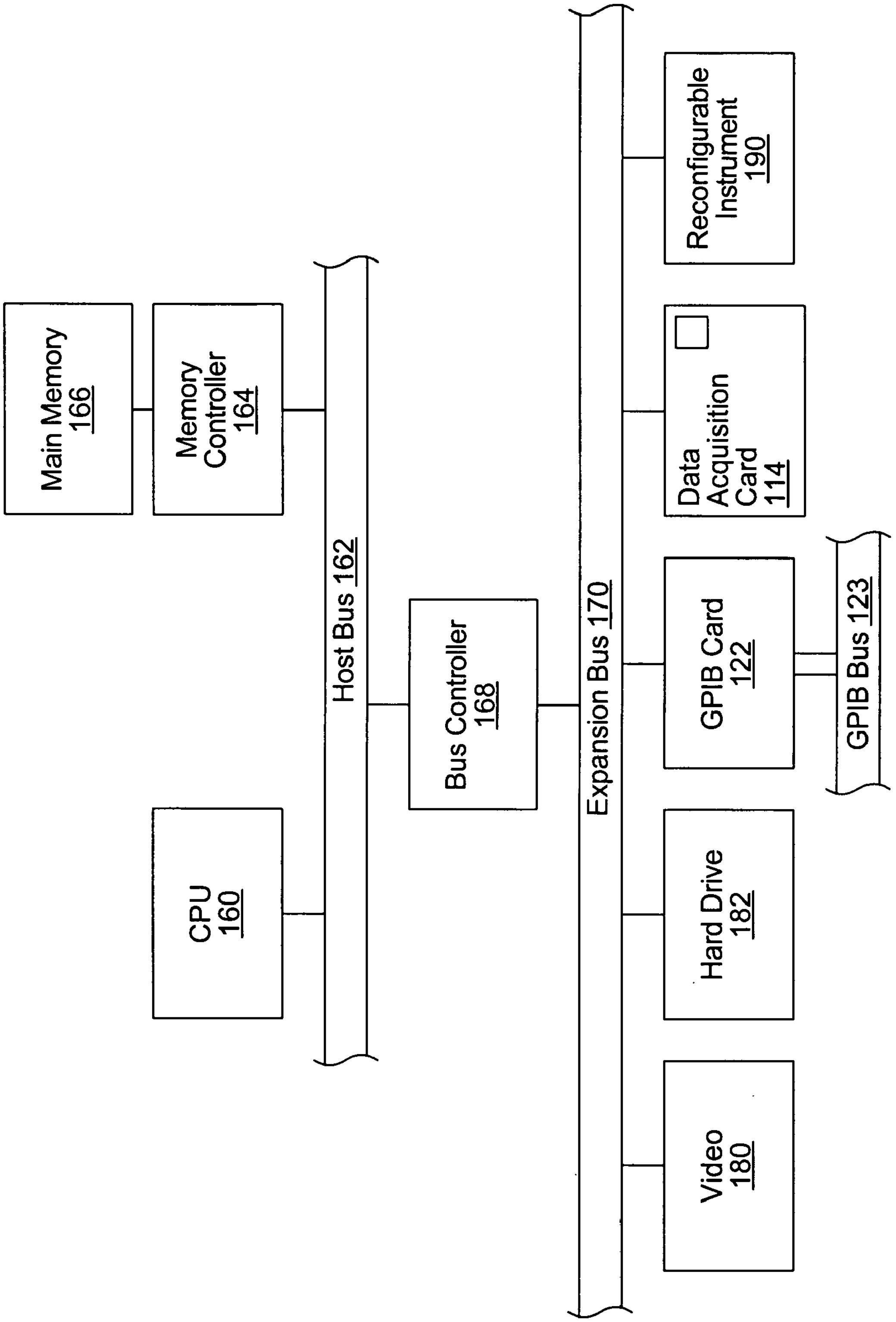
FIG. 4 is a block diagram of the computer system of FIGS. 1, 2A, 2B and/or 3.

FIG. 4—Computer System Block Diagram

FIG. 4 is a block diagram representing one embodiment of the computer system 82 illustrated in FIGS. 1, 2A, 2B, and/or 3. It is noted that any type of computer system configuration or architecture can be used as desired, and FIG. 4 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an ×86 processor, e.g., a Pentium class, a PowerPC processor, a CPU from the SPARC family of RISC processors, as well as others. Main memory 166 is coupled to the host bus 162 by means of memory controller 164. In one embodiment, the main memory 166 may store a prototyping environment application for creating, configuring, and/or performing an application. The main memory 166 may also store an application created using the prototyping environment application. In another embodiment, the main memory 166 may store a program that was automatically, i.e., programmatically generated by the prototyping environment based on an application, where the program is operable to perform the application. In one embodiment, the main memory 166 may store an application development environment associated with a programmatically generated program. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface 123 to a GPIB instrument. The computer 82 further comprises a video display subsystem 180 and hard drive 182 coupled to the expansion bus 170.

A reconfigurable instrument 190 may also be connected to the computer. In various embodiments, the configurable logic may be included on an instrument or device connected to the computer through means other than an expansion slot, e.g., the instrument or device may be connected via an IEEE 1394 bus, USB, or other type of port. Also, the configurable logic may be comprised on a device such as the data acquisition board 114. In one embodiment, at least a portion of an application may execute on the reconfigurable instrument 190.

Figure 5:
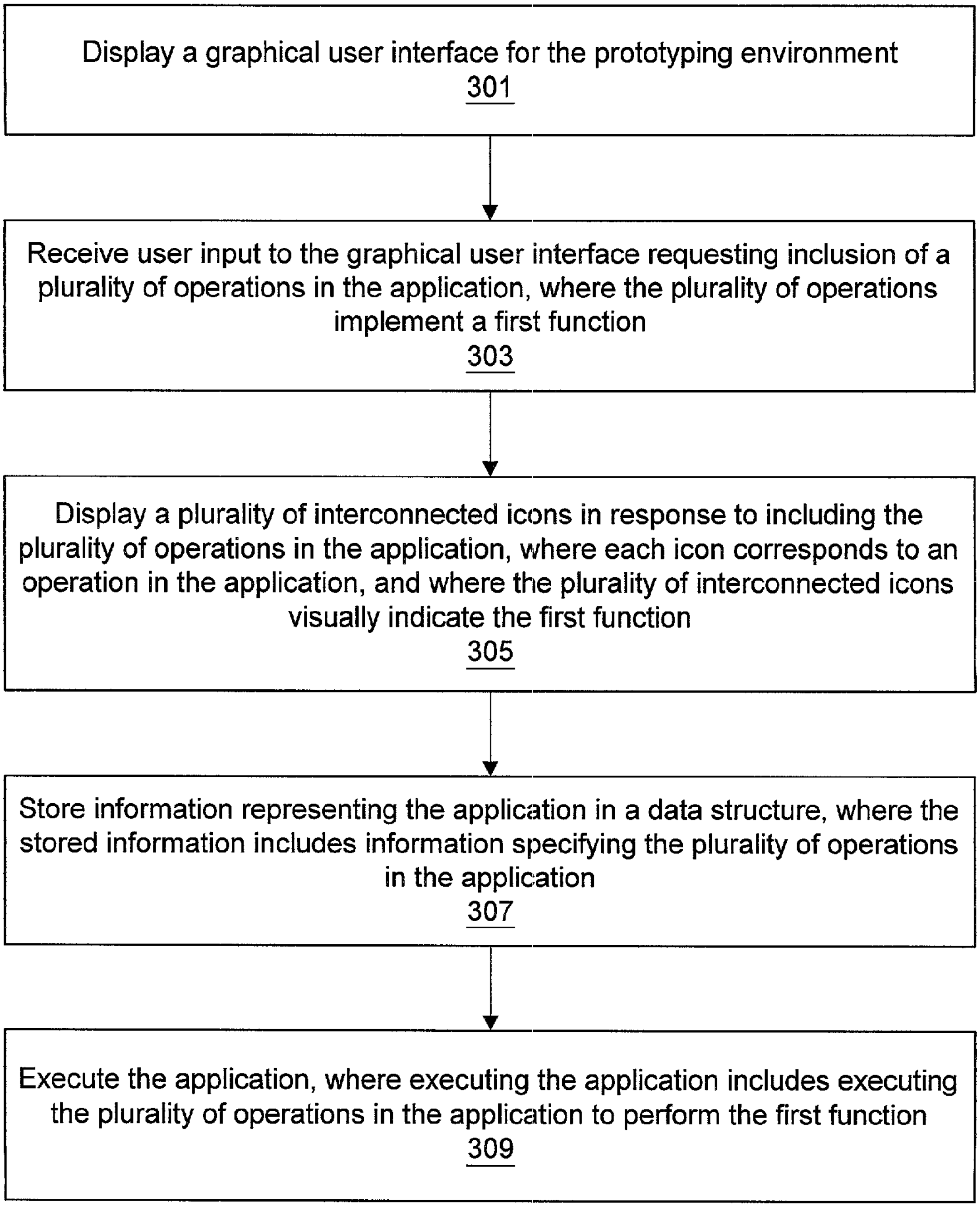
FIG. 5 is a flowchart diagram illustrating one embodiment of a method for displaying operations in an application by using a graphical programming visual representation.

FIG. 5—Displaying Application Operations Using a Graphical Programming Representation FIG. 5 is a flowchart diagram illustrating one embodiment of a method for displaying operations in an application by using a graphical programming visual representation. It is noted that FIG. 5 illustrates a representative embodiment, and alternative embodiments are contemplated. Also, various elements may be combined, omitted, or performed in different orders.

In 301, a graphical user interface for a prototyping environment may be displayed. The graphical user interface may provide graphical access to a set of operations available for inclusion in an application. In various embodiments, any of various operations may be provided. For example, as discussed above, the prototyping environment may be intended for creating applications or solutions for problems in any of various domains. Exemplary user interfaces for exemplary machine vision prototyping environments are described below. The GUI may include various menus, dialogs, controls or other GUI elements that the user may use to select operations and/or apply operations to a displayed object or image.

In 303, user input requesting inclusion of a plurality of operations in the application may be received to the graphical user interface. The plurality of operations may implement a first function. In one embodiment, the user is not required to specify or write any program source code to implement the application or specify the operations in the application. Instead, the application may be created graphically by interacting with the graphical user interface of the prototyping environment to include operations in the application.

As described above, in various embodiments the plurality of operations in the application may implement any of various functions or solutions. As one example, the plurality of operations may include one or more machine vision operations that implement a machine vision function, such as for acquiring and/or analyzing images. As another example, the plurality of operations may include one or more motion control operations that implement a motion control function, such as for controlling motion of a device and/or controlling a device to move an object. As another example, the plurality of operations may include one or more data acquisition (DAQ) operations that implement a DAQ function, such as for acquiring measurement data from a device.

The operations in the application may be related to one another or structured in any of various ways. For example, in one embodiment, the application may comprise a sequence of operations. In one embodiment, each operation in the sequence may be performed sequentially. In another embodiment, the user may specify conditional branches that may result in some operations being skipped or performed in different orders, e.g., depending on results of performing previous operations. The user may also specify other types of constructs, such as iteration, looping, jumps, etc.

In various embodiments, the user may perform any of various actions or may interact with the graphical user interface of the prototyping environment in any of various ways to cause operations to be included in the application. For example, in one embodiment, a plurality of buttons may be displayed, each button corresponding to a particular operation. The user may press the appropriate button to add the desired operation. In another embodiment, a library of icons may be displayed on a panel or palette, where each icon corresponds to a particular operation available for inclusion in the application. The user may select the appropriate icon to add the desired operation. In other embodiments, the user may utilize other menu, keyboard, and/or voice commands to add an operation to the application.

In one embodiment, operations may be included in the application in response to the user performing the operations on an object of interest. For example, the user may select various operations to apply to the object, and this may cause the operations to be included in or stored in the application. Thus, the application may specify the operations applied to the object. The object or an image of the object may also be updated to reflect results of applying the operations to the object. In one embodiment, the user may directly perform operations on an object, such as by using a virtual reality glove or similar device to manipulate a physical object, and the operations performed by the user may be recorded as operations in the application. Head tracking and eye tracking devices, and other types of virtual reality devices, may also be used.

In one embodiment, operations may be included in the application in response to the user performing operations on an object displayed on the screen, e.g., an image of an object. The object image may represent a physical system or device. The user may graphically manipulate or otherwise selection operations to affect the object image. For example, the user may desire to create a robotic application to assemble a portion of an automobile, and the user may graphically select and place automobile parts on the screen to create the application.

In an embodiment targeted toward machine vision, the system may display an image, and the user may perform machine vision operations on the displayed image, which may cause visual changes to the displayed image according to the operation performed. As the user performs machine vision operations on the displayed image, the machine vision operations may be included in or stored in the application.

In one embodiment each operation may be interactively executed as the operation is included in the application, e.g., may be executed automatically in response to including the operation in the application or may be executed in response to a user request. For example, this may help the user to verify that each individual operation in the application performs as intended. Also, in one embodiment, each operation may be included in the application in response to executing the operation, e.g., in response to applying the operation to an object.

In one embodiment, the graphical user interface of the prototyping environment may be updated to illustrate the effect of including and/or executing each new operation. For example, as noted above, the graphical user interface of a machine vision prototyping environment may display an image, and the image may be updated to illustrate the effect of applying a new machine vision operation included in the application to the image. As another example, the graphical user interface of a motion control prototyping environment may display one or more views of motion control performed by the application, such as a two-dimensional and/or three-dimensional view of the cumulative movement specified by the application, as well as other types of views, such as a graph indicating a velocity profile. These views may be updated to illustrate the effect of adding a new motion control operation to the motion control application. In this example, the motion control operations may not actually be executed as they are added to the motion control application, e.g., may not actually cause a motion control device to move, but rather their effects may be simulated on the graphical user interface.

In one embodiment, each operation included in an application may have various associated properties, attributes, or parameters affecting the operation. For example, an arc move motion control operation may have parameters or properties such as a radius, a start angle, and a travel angle. These parameters may initially have default values. The user may configure these parameters or properties (typically using a GUI) to customize each operation.

In the preferred embodiment, the user may configure the parameters of the operations graphically, without having to write any program code. For example, a graphical panel for configuring the operation may be displayed. This panel may be automatically displayed in response to selecting the operation or adding the operation to the application, or the panel may be displayed in response to user input requesting to configure the operation. User input for configuring the operation may be received to the graphical panel. For example, the panel may include various user interface elements for changing parameter or property values of the operation, such as numeric GUI controls, check boxes, etc.

In one embodiment, the graphical user interface of the prototyping environment may be updated to illustrate the effect of configuring the operation. For example, if the user changed a travel angle parameter of an arc move operation in a motion control application, then one or more views of the motion control performed by the application may be updated to visually reflect the new travel angle performed by the arc move operation.

In 305, a plurality of interconnected icons may be displayed in response to including the plurality of operations in the application. Each icon may correspond to an operation included in the application. The interconnection between icons may indicate sequencing (or data flow) between the operations. The plurality of interconnected icons may visually indicate the first function implemented by the plurality of operations in the application.

In one embodiment, as each operation is added to the application in 303, a corresponding icon may be added to the plurality of icons and may be visually interconnected to one or more other previously displayed icons (if any). In an embodiment in which the user applies desired operations to an object, a corresponding icon may be displayed to visually represent each operation applied to the object. Thus, as the user performs each additional operation on the object, a corresponding icon may be immediately displayed to visually represent this operation.

Thus, when the user adds a first operation to the application, a corresponding first icon may be displayed representing the first operation. In addition, a name or other indicia of the respective first operation may optionally be displayed in a graphical user interface of the application development environment. When the user adds a second operation to the application, a corresponding second icon may then be displayed representing the second operation. In addition, a name or other indicia of the respective second operation may optionally be displayed in the graphical user interface of the application development environment. The second icon may be automatically connected to the first icon to indicate the sequence of operations. When the user adds a third operation to the application, a corresponding third icon may then be displayed representing the third operation. In addition, a name or other indicia of the respective third operation may optionally be displayed in the graphical user interface of the application development environment. The third icon may be automatically connected to the second icon to indicate the sequence of operations. The above process repeats, where new icons are added to the block diagram representation (and connected with already displayed icons) as the user adds operations to the application.

Each icon may be designed to represent the respective operation using an intuitive picture. As one example, a pattern matching machine vision operation may be represented using an icon illustrating a magnifying glass to indicate that the operation involves performing a type of search on an image. In one embodiment, a name of the operation may also be displayed together with the icon.

Displaying the plurality of interconnected icons may include displaying a plurality of lines interconnecting the icons, where each line connects two icons. For example, as each new icon is added, a line may be automatically displayed to connect the new icon to a previously displayed icon. In one embodiment, the plurality of lines may indicate an execution order for one or more operations in the application. For example, where the plurality of lines includes a first line that connects a first icon to a second icon, the first line may indicate that performing the first function includes performing the operation corresponding to the first icon before performing the operation corresponding to the second icon. In another embodiment, the first line may indicate that data produced by the operation corresponding to the first icon is used by the operation corresponding to the second icon. In various embodiments, the plurality of interconnected icons may represent one or more of data flow, control flow, and/or execution flow for the plurality of operations in the application. Thus, the plurality of interconnected icons may be referred to as a graphical programming visual representation of the plurality of operations in the application.

In one embodiment, each displayed icon may correspond to a node in a graphical programming development environment. In this embodiment, the displayed icons may be referred to as "node icons". In other words, for each operation provided by the prototyping environment, there may be an equivalent node in the graphical programming development environment. Each of these nodes in the graphical programming development environment may have an iconic appearance that is identical to or substantially the same as the corresponding icon displayed in the prototyping environment. Thus, as the user interacts with the prototyping environment to create an application, the user may become familiar with specific nodes available for use in the graphical programming development environment. This may advantageously increase the user's efficiency when subsequently using the graphical programming development environment to create a graphical program.

In one embodiment, the displayed block diagram representation (or graphical program representation) may itself be an executable graphical program. Also, as described below, in another embodiment the prototyping environment may be operable to programmatically (automatically) generate a graphical program based on an application. Nodes in the generated graphical program may appear the same as or substantially the same as the plurality of interconnected icons displayed in 305. Thus, the user may recognize the implementation of the graphical program, making it easier to understand or modify the graphical program.

It is noted that the difference between 1) the displayed block diagram representation itself being an executable graphical program and 2) the displayed block diagram representation itself not being an executable graphical program, wherein the system is operable to programmatically (automatically) generate a graphical program based on a created application, may be invisible to the user. This is especially so where the programmatically generated graphical program has the same appearance as the block diagram representation.

In 307, information representing the application may be stored, e.g., in a data structure or file. Information is preferably stored in the data structure as the user performs each operation. The stored information may include information specifying the plurality of operations in the application. For example, the data structure or file may store names or other identifiers that identify the operations in the application. The data structure or file may also store information regarding various properties or parameter values configured for one or more operations in the application.

Thus, in one embodiment, after the user provides input to the prototyping environment to add an operation to the application, the following may be performed: 1) the operation is stored in memory, 2) an image of a displayed object may be changed according to the operation, 3) a new icon may be displayed in the block diagram representation, where the new icon represents the operation, and 4) the new icon may be connected with a pre-existing icon (assuming the new icon does not represent the first operation). The operation may also be displayed in an alternative form in the GUI of the prototyping environment. For example, the textual name of the operation may be displayed in a script window.

As mentioned above, in one embodiment each operation may be interactively executed as the operation is included in the application. As shown in 309, the entire application may also be executed, e.g., after the user has included all desired operations in the application. Executing the application may include executing the plurality of operations in the application to perform the first function. In one embodiment, the application may be executed under control of the prototyping environment application. In one embodiment, executing one or more of the operations in the application may include interacting with or controlling one or more instruments or devices, such as discussed above with reference to FIGS. 2A, 2B, and 3.

In one embodiment, when an operation in the application is executed, e.g., either executed individually as the operation is included in the application or executed together with other operations in the application, results of executing the operation may be displayed together with the icon that corresponds to the operation. As one example, the operation may be executable to determine a pass/fail result. This, the pass/fail result may be displayed together with the icon that corresponds to the operation. In one embodiment, if executing an operation produces a fail result, then information indicating a reason for the fail result may also be displayed together with the icon.

In one embodiment, in addition to displaying the plurality of interconnected icons that represent the operations in the application, the operations in the application may also be displayed using other techniques. For example, the prototyping environment may also be operable to display a text view indicating the plurality of operations in the application. As one example, displaying the text view may include displaying a table including text that specifies the plurality of operations in the application.

In one embodiment, when the user executes the application, the displayed icons may be highlighted to visually indicate which of the operations in the application is currently being executed. The connections between icons may also be animated, such as with "propagating bubbles", to visually indicate flow of data or flow of execution. Thus, the plurality of interconnected icons may be animated, such as in the "execution highlighting" feature of LabVIEW, to visually indicate which operations are being performed. In one embodiment, corresponding modifications may be made to the displayed image as the application is executed. The corresponding modifications made to the displayed image may be made as a respective icon corresponding to the operation being performed is highlighted. This provides the user with a visual indication of which operation is being executed, and how this operation is affecting the image. This provides an improved debugging or feedback tool to the user.

As noted above, FIG. 5 illustrates one particular embodiment of the method, and various alternative embodiments are contemplated.

Figure 6:
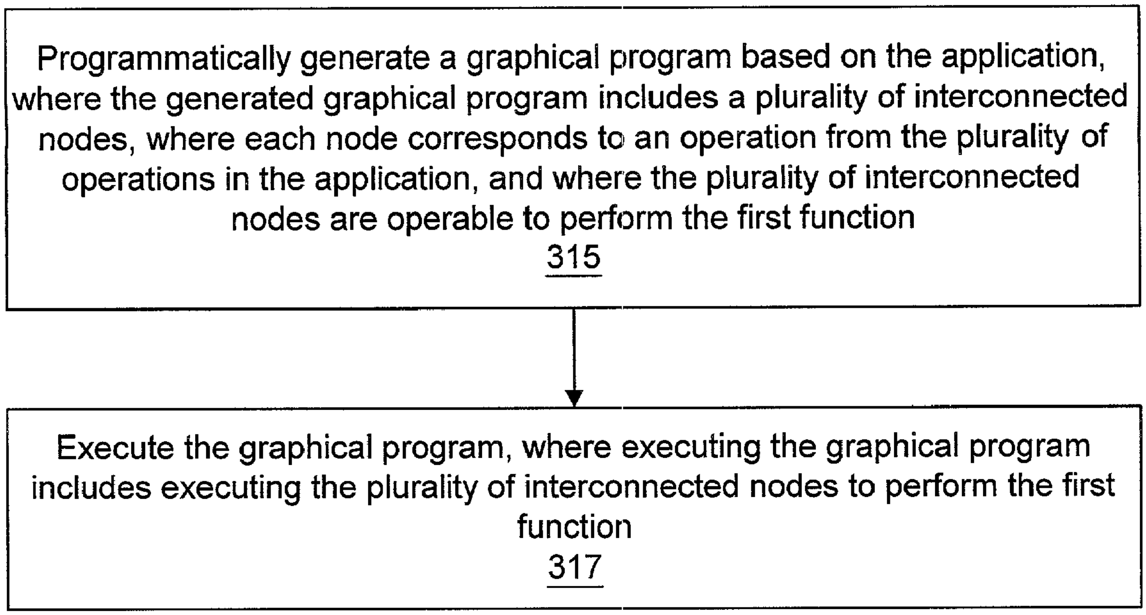
FIG. 6 is a flowchart diagram illustrating one embodiment of a method for programmatically generating a graphical program based on an application.

FIG. 6—Programmatically Generating a Graphical Program Based on an application As mentioned above, in one embodiment, a graphical program may be programmatically or automatically generated based on an application. FIG. 6 is a flowchart diagram illustrating one embodiment of a method for programmatically generating a graphical program based on an application. It is noted that FIG. 6 illustrates a representative embodiment, and alternative embodiments are contemplated.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also have a graphical user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output used by the graphical program or VI, and may include other icons which represent devices being controlled. The user interface or front panel may be included in a single window of user interface elements, or may include a plurality of individual windows each having one or more user interface elements, wherein the individual windows may optionally be tiled together. As another example, the user interface or front panel may include user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

In 315, the graphical program may be programmatically generated based on the application. The generated graphical program may include a plurality of interconnected nodes. The plurality of interconnected nodes may be operable to perform the first function implemented by the plurality of operations in the application.

The graphical program may be automatically generated with little or no user input received during the generation process. In one embodiment, the graphical program may be programmatically generated with no user input required. In another embodiment, the user may be prompted for certain decisions during or prior to the programmatic generation, such as the type of graphical program to generate, the look and feel of a user interface for the graphical program, the number or degree of comments contained within the graphical program, etc.

In one embodiment, each node included in the graphical program may correspond to an operation from the plurality of operations in the application. As described above with reference to FIG. 5, icons corresponding to each of the operations in the application may be displayed in 305. Each node included in the graphical program may have an iconic appearance that is identical to or substantially the same as one of these icons. For example, if in 305 a first icon corresponding to a first operation is displayed, then in 315 a first node having an iconic appearance identical to or substantially the same as the first icon may be programmatically included in the graphical program. The first node may be operable to perform the first operation when the graphical program is executed.

In one embodiment, the plurality of interconnected nodes in the graphical program may appear identical to or substantially the same as the plurality of interconnected icons displayed in 305. Thus, the user may easily recognize and understand the function of the graphical program when the user views the graphical program.

In one embodiment, in addition to including a plurality of interconnected nodes operable to perform the first function in the graphical program, one or more additional nodes or other elements may also be programmatically included in the graphical program. For example, one or more additional nodes may be included that do not correspond to operations from the plurality of operations in the application. For example, such additional nodes or elements may perform setup functions, cleanup functions, I/O functions, or other functions for the graphical program. In one embodiment, the graphical program may include a main block diagram having a subprogram node, where the plurality of interconnected nodes operable to perform the first function are programmatically included in a block diagram of the subprogram node.

The generated graphical program may be a graphical program associated with a particular graphical programming development environment application. For example, the program may include nodes provided by the graphical programming development environment or may run under control of the graphical programming development environment.

In one embodiment, the graphical program may be automatically displayed after the graphical program has been programmatically generated. In another embodiment, the user may request to display or open the graphical program after the graphical program has been programmatically generated. The graphical program may be displayed in a separate window from the plurality of interconnected icons displayed in 305. For example, the plurality of interconnected icons may be displayed in a window of the prototyping environment, whereas the graphical program is displayed in a window of a graphical programming development environment.

In one embodiment, the prototyping environment application may include all program logic necessary for generating the graphical program. In other words, the prototyping environment application may generate the graphical program without need of any other applications or services. Alternatively, the prototyping environment may act as a client to a server program, e.g., a graphical programming development environment application, in order to request the server program to generate part or all of the graphical program. For example, the client program may interface with the server program through an application programming interface (API). The server program may reside on the same computer system as the prototyping environment application or on a different computer system.

Additional information related to programmatically generating a graphical program may be found in the above-incorporated patent applications.

In 317, the graphical program may be executed. Executing the graphical program may include executing the plurality of interconnected nodes to perform the first function. In one embodiment, executing the graphical program may include interacting with or controlling one or more instruments or devices, such as discussed above with reference to FIGS. 2A, 2B, and 3. In one embodiment, the user may customize the graphical program before executing the graphical program. For example, the user may modify the generated graphical program or add additional elements to the graphical program.

In another embodiment, instead of programmatically generating the entire graphical program after the user has finished creating the application, the graphical program may be interactively generated as the user creates the application. For example, as each operation is selected for inclusion in the application, a corresponding node may be dynamically included in the graphical program. The corresponding node may be operable to perform the respective operation when the graphical program is executed. Similarly, if the user requests to remove an operation from the application, the corresponding node may be dynamically removed from the graphical program.

Figure 7:
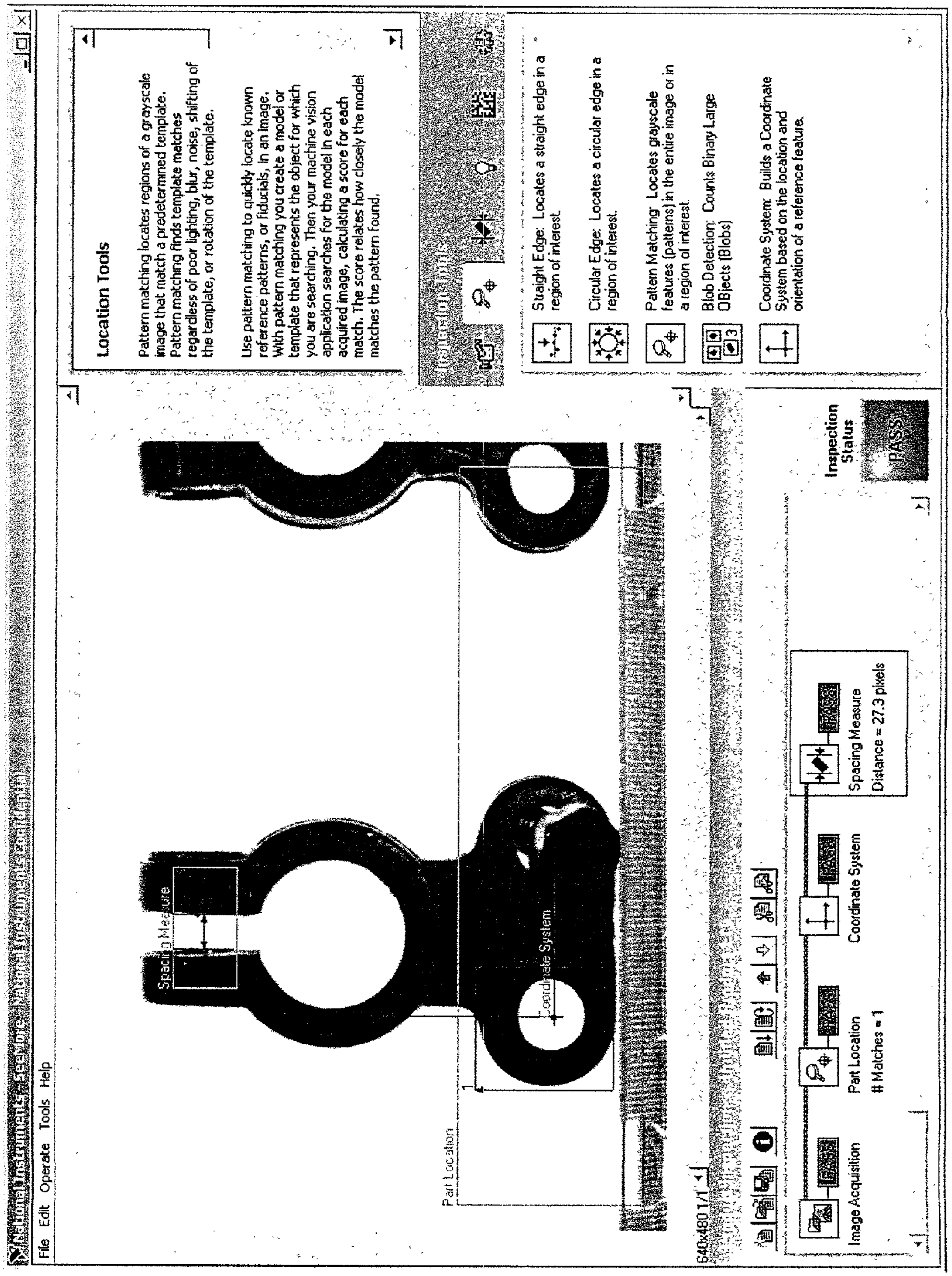
FIGS. 7–8 and 11–12 illustrate an exemplary graphical user interface for one embodiment of a machine vision prototyping environment application.

FIGS. 7–12: Machine Vision Prototyping Environment User Interface and Example Graphical Program FIG. 7 illustrates an exemplary user interface for one embodiment of a machine vision prototyping environment application. The machine vision prototyping environment may enable a user to easily load or acquire an image and quickly apply various machine vision operations to the image, immediately seeing the results. The machine vision operations selected and applied by the user may be recorded as a machine vision application.

In various embodiments, the machine vision prototyping environment may be operable to load, acquire, and/or manipulate any of various types of images, including gray-level and color images. The prototyping environment may also support complex images in which pixel values have a real part and an imaginary part. The images may be obtained from any of various sources. The images may, for example, be obtained from an image file, such as a BMP, TIFF, AIPD, PNG, JPG, or GIF file, or a file formatted according to another image format. The images may also be acquired from a hardware device, such as a camera. For example, images may be acquired from a device such as the video device 132 illustrated in FIGS. 2A and 2B, or from any of various other types of devices, including digital cameras, smart cameras, framegrabbers, etc.

The machine vision prototyping environment may support any of various machine vision operations. As used herein, the term "machine vision operation" may include any of various types of operations related to image analysis, image processing, image acquisition, or other machine vision-related operations. For example, the machine vision prototyping environment may provide access to machine vision operations or functions such as:

- filtering functions for smoothing, edge detection, convolution, etc.
- morphology functions for modifying the shape of objects in an image, including erosion, dilation, opening, closing, etc.
- thresholding functions for selecting ranges of pixel values in grayscale and color images
- particle filtering functions to filter objects based on shape measurements
- a histogram function that counts the total number of pixels in each grayscale value and graphs it
- a line profile function that returns the grayscale values of the pixels along a line drawn through the image with a line tool and graphs the values
- particle analysis functions that computes such measurements on objects in an image as their areas and perimeters
- a 3D view function that displays an image using an isometric view in which each pixel from the image source is represented as a column of pixels in the 3D view, where the pixel value corresponds to the altitude.
- an edge detection function that finds edges along a line drawn through the image with a line tool
- a pattern matching function that locates regions of a grayscale image that match a predetermined template
- a shape matching function that searches for the presence of a shape in a binary image and specifies the location of each matching shape
- a caliper function that computes measurements such as distances, areas, and angles based on results returned from other image processing functions
- a color matching function that quantifies which colors and how much of each color exist in a region of an image and uses this information to check if another image contains the same colors in the same ratio
- a function related to optical character recognition (OCR)
- a function related to optical character verification (OCV)
- a function related to 1D or 2D barcode analysis It is noted that the machine vision functions listed above are exemplary only and that, in various embodiments of a machine vision prototyping environment, other types of machine vision functions or operations may be supported.

As shown in the lower right corner of FIG. 7, the graphical user interface of the machine vision prototyping environment provides access to a library of available machine vision operations. The user may select desired operations from this library. FIG. 7 illustrates the state of the graphical user interface after the user has included four machine vision operations in the application, namely: an image acquisition operation to acquire an image from a camera; a pattern matching operation to locate instances of a specified pattern within the image; a coordinate system operation to establish a coordinate system within the image; and a gauge operation to measure a distance between two points in the image.

The bottom left corner of FIG. 7 illustrates a plurality of interconnected icons that visually represent the machine vision operations in the application. Other information is also displayed along with the icons. For example, a user-specified name of each operation is displayed together with the respective icon. Also, for each operation a pass/fail result determined by executing the operation is displayed. In this example, all operations produced pass results. Also, some of the operations produced additional execution results. For example, the pattern matching operation (named "Part Location" in this example) determined one match in the image, as indicated under the respective icon. Similarly, the gauge operation (named "Spacing Measure" in this example) determined a distance of 27.3 pixels, as indicated under the respective icon.

Figure 8:
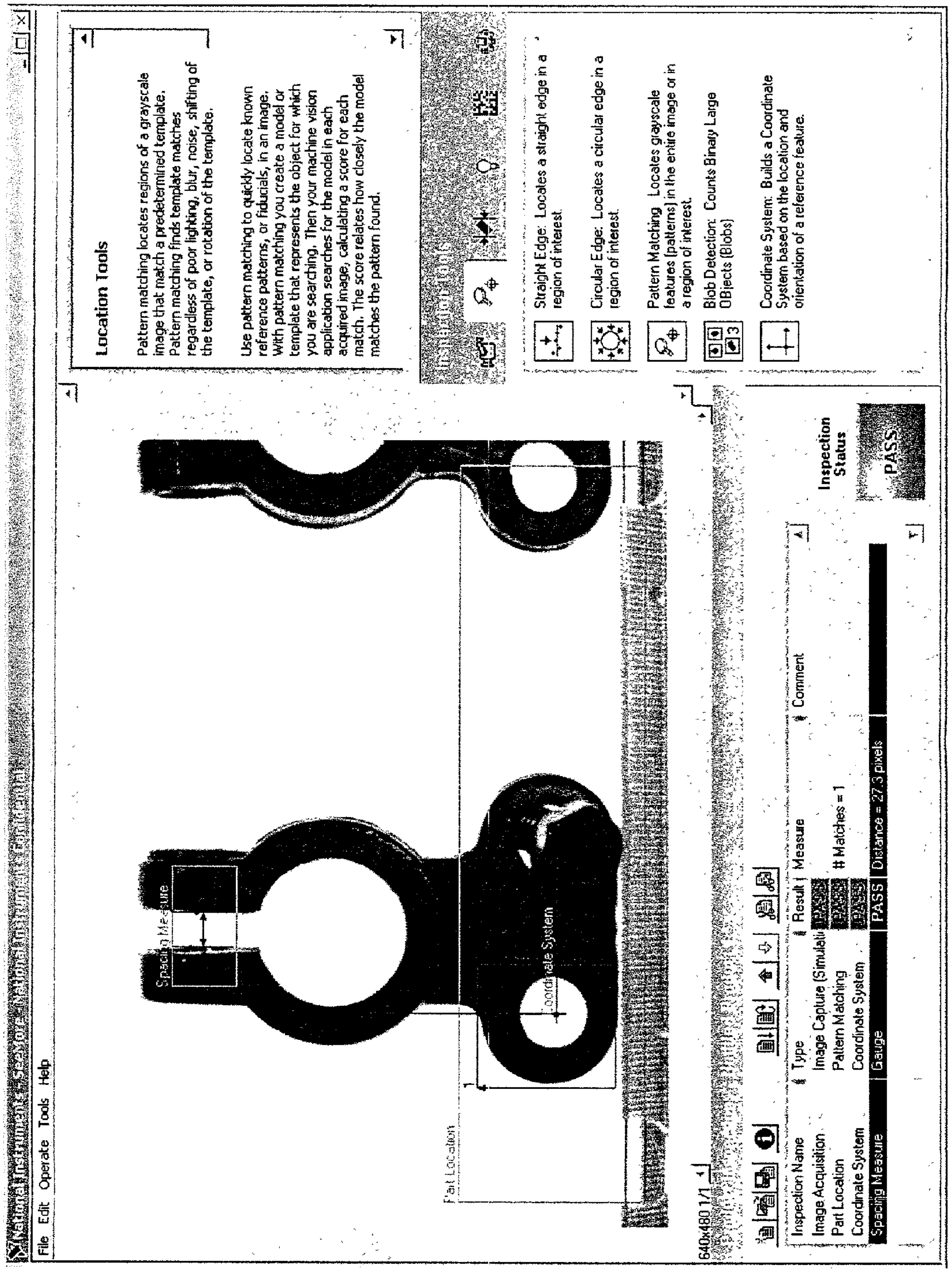

As described above, in one embodiment, in addition to displaying a plurality of interconnected icons that represent the operations in an application, a prototyping environment may also be operable to display a table including text that specifies the plurality of operations in the application. FIG. 8 illustrates one example of such a table. The user may choose to view either the table or the plurality of interconnected icons.

Figure 9:
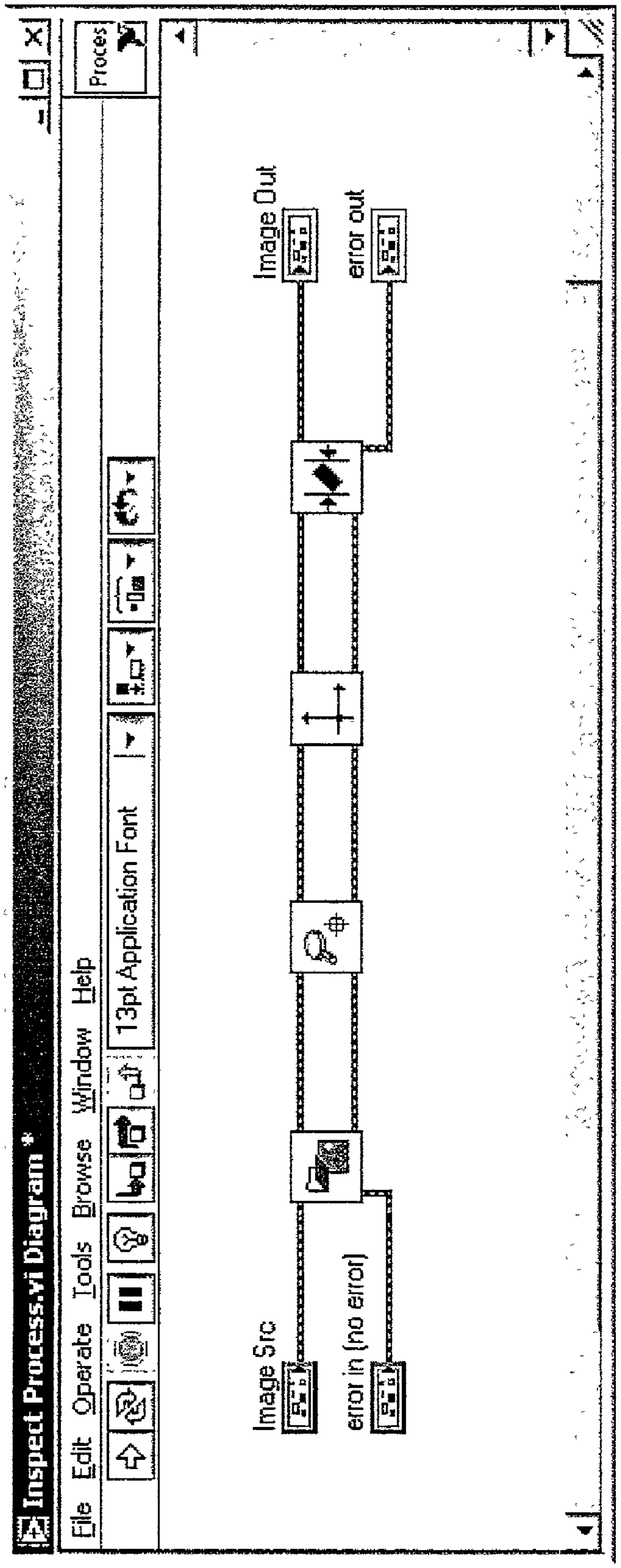
FIG. 9 illustrates a block diagram of a graphical program programmatically generated based on an application created using the machine vision prototyping environment application of FIGS. 7 and 8.
Figure 10:
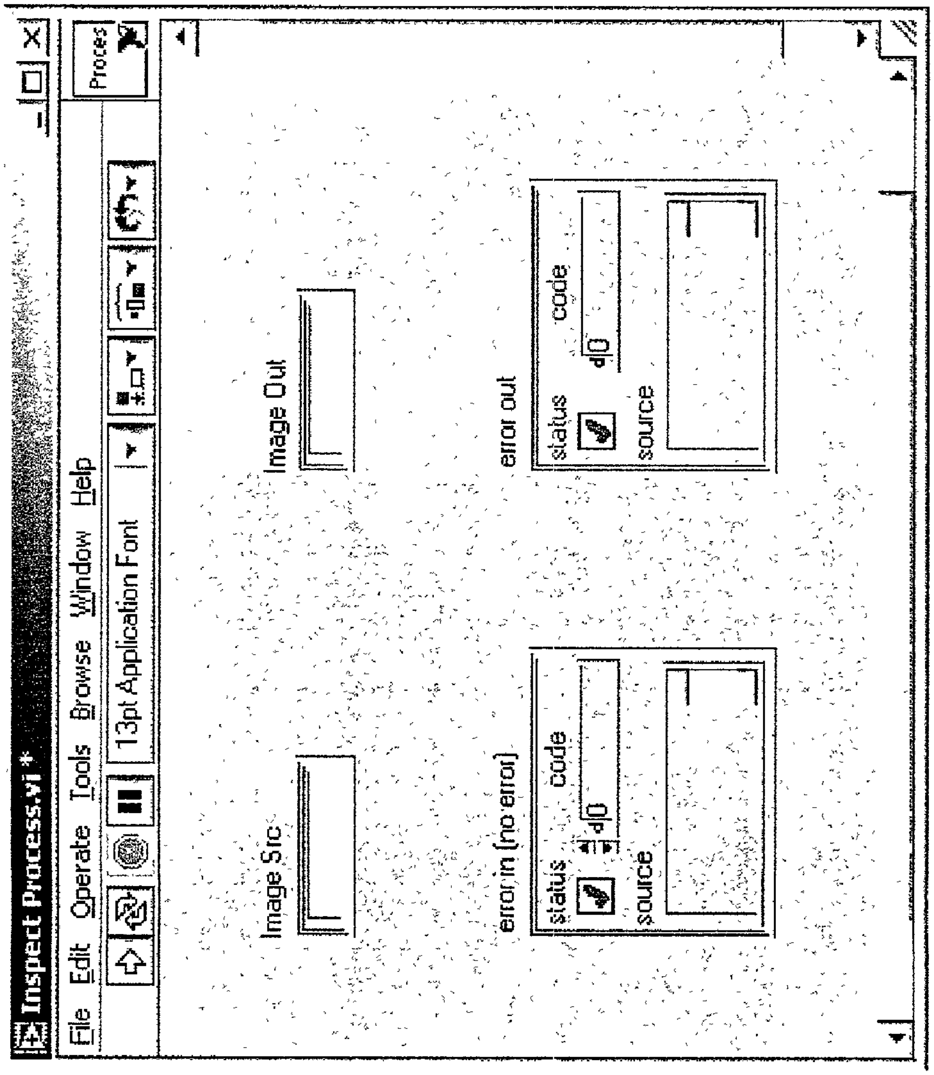
FIG. 10 illustrates a user interface for the programmatically generated graphical program of FIG. 9.

FIG. 9 illustrates a graphical program programmatically generated based on the application shown in FIGS. 7 and 8. For example, the user may have selected a menu item or otherwise requested the graphical program to be generated. In another embodiment, the graphical program may be dynamically generated as the user creates the application, as described above. Note that the graphical program appears substantially the same as the plurality of interconnected icons illustrated in FIG. 7. However, in addition to programmatically including nodes corresponding directly to icons from this plurality of icons, additional nodes have also been programmatically included in the graphical program. Specifically, four user interface terminal nodes have also been included in the graphical program. In this case, when the graphical program was programmatically generated, the user interface or front panel shown in FIG. 10 was also generated for the graphical program. Each user interface terminal node in FIG. 9 corresponds to a user interface element on the user interface of FIG. 10.

Figure 11:
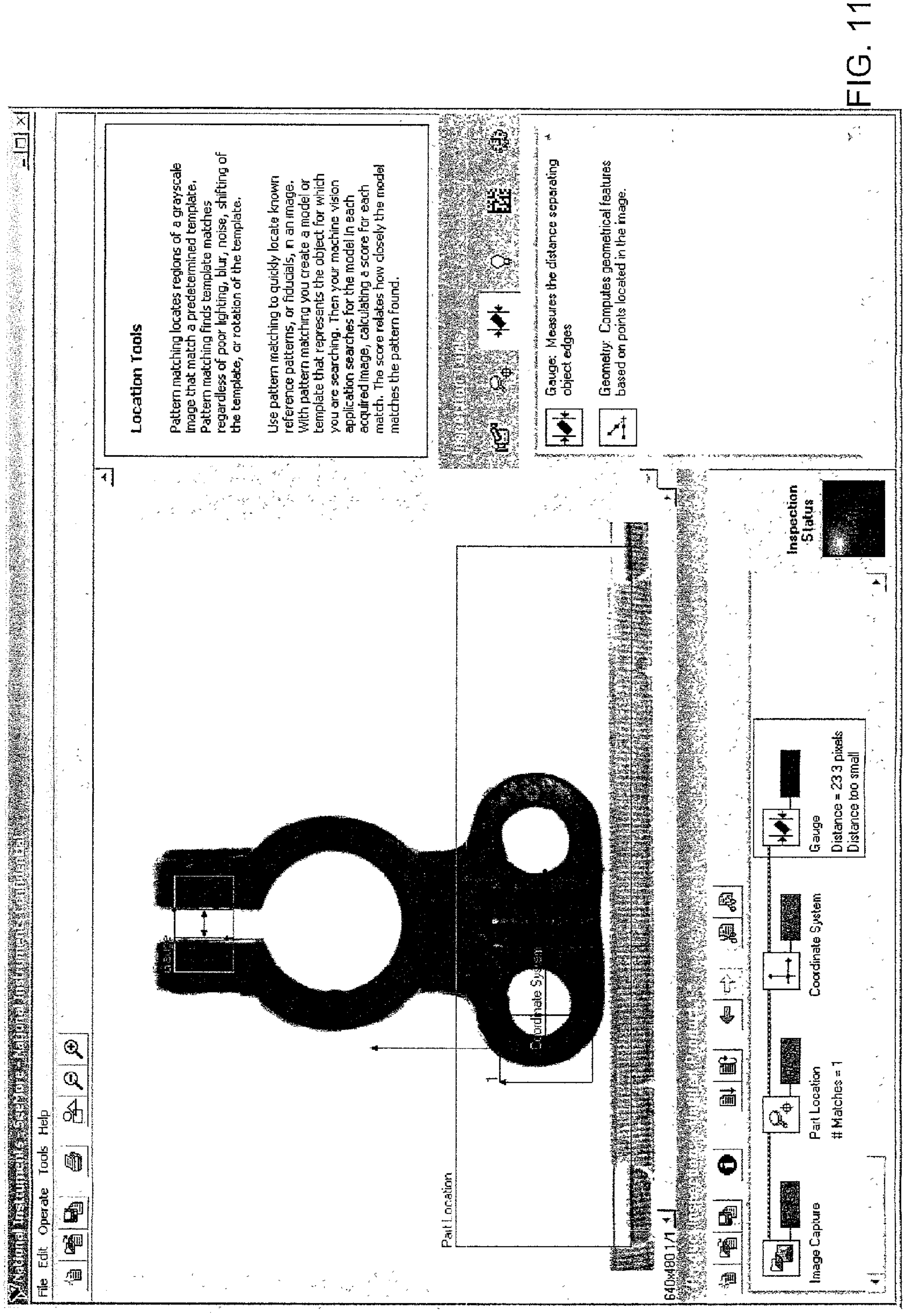
Figure 12:
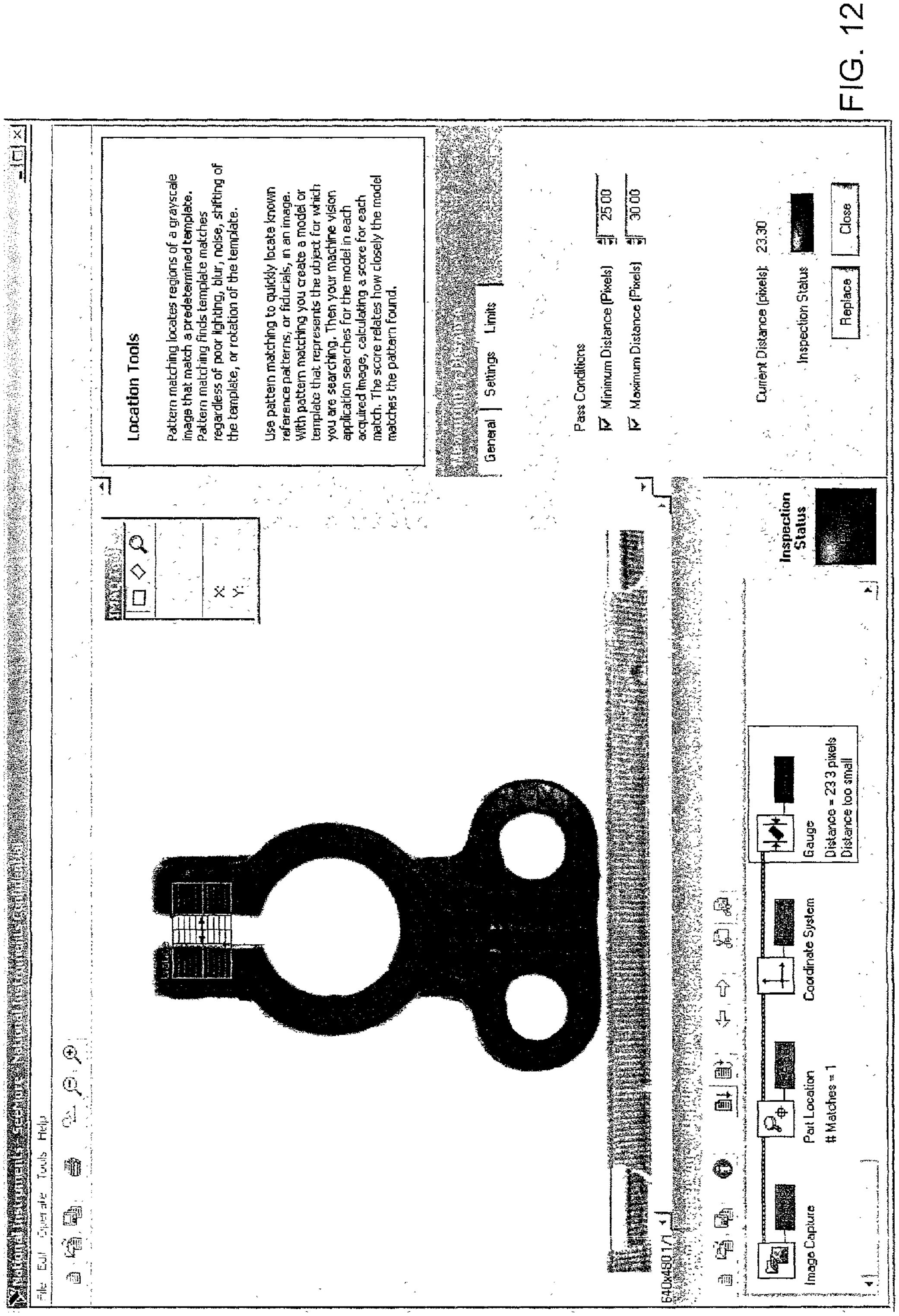

FIG. 11 is similar to FIG. 7. A similar image is being analyzed as in FIG. 7. However, the distance between the two arms of the image is slightly smaller, causing the gauge operation to produce a fail result when executed, as indicated together with the corresponding icon. FIG. 12 illustrates a graphical panel for configuring the gauge operation.

As shown, the operation is configured with pass conditions specifying a minimum distance of 25.00 and a maximum distance of 30.00 pixels. Since the actual distance measured was 23.3 pixels (as indicated under the corresponding icon), the operation produced a fail result.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for displaying operations of an application, the method comprising:

including a plurality of operations in the application in response to user input, wherein the plurality of operations implement a first function;

automatically displaying a plurality of interconnected icons in response to said including the plurality of operations in the application, wherein each icon corresponds to an operation in the application, wherein the plurality of interconnected icons visually indicate the first function, wherein the plurality of interconnected icons appear substantially the same as a graphical data flow program, wherein said automatically displaying the plurality of interconnected icons comprises automatically displaying connections among the icons without user input creating the connections; and storing information representing the application in a data structure, wherein said storing the information comprises storing information specifying the plurality of operations in the application.

2. The method of claim 1, wherein said including the plurality of operations in the application comprises receiving user input individually selecting each operation for inclusion in the application;

wherein said automatically displaying the plurality of interconnected icons comprises automatically displaying at least one icon after each instance of said user input including one of said operations in the application, wherein said automatically displaying the at least one icon comprises displaying the at least one icon without user input selecting the at least one icon.

3. The method of claim 1, wherein said including and said displaying comprise:

including a first operation in the application in response to user input;

automatically displaying a first icon corresponding to the first operation in response to said including the first operation in the application, wherein said automatically displaying the first icon comprises displaying the first icon without user input selecting the first icon;

including a second operation in the application in response to user input; and automatically displaying a second icon corresponding to the second operation in response to said including the second operation in the application, wherein said automatically displaying the first icon comprises displaying the first icon without user input selecting the first icon; and automatically displaying a connection between the first icon and the second icon, wherein said automatically displaying the connection comprises displaying the connection without user input specifying the connection.

4. The method of claim 1, wherein said automatically displaying the connections among the icons comprises automatically displaying a plurality of lines interconnecting the icons, wherein each line connects at least two icons;

wherein the plurality of lines indicate a relationship of the icons.

5. The method of claim 4, wherein the plurality of lines includes a first line that connects a first icon directly to a second icon;

wherein the first line indicates that the operation corresponding to the first icon is performed before the operation corresponding to the second icon.

6. The method of claim 4, wherein the plurality of lines include a first line that connects a first icon directly to a second icon;

wherein the first line indicates that data produced by the operation corresponding to the first icon is used by the operation corresponding to the second icon.

7. The method of claim 1, wherein said displaying the plurality of interconnected icons comprises displaying a graphical programming representation of the plurality of operations in the application.

8. The method of claim 1, wherein said including the plurality of operations in the application in response to user input comprises including the plurality of operations in a first application in response to user input to a second application;

wherein each icon corresponds to a node in a graphical programming development environment, wherein the graphical programming development environment is not the same as the second application.

9. The method of claim 1, further comprising:

automatically generating a graphical program based on the application, wherein the graphical program is separate from the application;

wherein said automatically generating the graphical program comprises automatically including a plurality of interconnected nodes in the graphical program, wherein each node corresponds to an operation from the plurality of operations in the application, wherein the plurality of interconnected nodes are automatically included in the graphical program without user input specifying the plurality of interconnected nodes;

wherein the plurality of interconnected nodes in the graphical program implement the first function, and wherein the plurality of interconnected nodes in the graphical program are separately displayable from the plurality of icons and visually indicate the first function.

10. The method of claim 9, wherein each of the nodes has an iconic appearance that is substantially identical to the icon corresponding to the operation to which the node corresponds.

11. The method of claim 9, further comprising:

displaying the graphical program, wherein displaying the graphical program comprises displaying the plurality of interconnected nodes in the graphical program, wherein the plurality of interconnected nodes in the graphical program are displayed separately from the plurality of interconnected icons;

wherein the plurality of interconnected nodes in the graphical program appear substantially identical to the plurality of interconnected icons.

12. The method of claim 11, wherein said displaying the plurality of interconnected icons comprises displaying the plurality of interconnected icons in a first window;

wherein said displaying the plurality of interconnected nodes in the graphical program comprises displaying the graphical program in a second window.

13. The method of claim 9, wherein said automatically generating the graphical program further comprises automatically including one or more additional nodes in the graphical program that do not correspond to operations from the plurality of operations in the application.

14. The method of claim 9, further comprising:

executing the graphical program;

wherein said executing the graphical program comprises executing the plurality of interconnected nodes to perform the first function.

15. The method of claim 1, wherein said including the plurality of operations in the application comprises receiving user input individually selecting each operation for inclusion in the application;

wherein the method further comprises automatically including a node in a graphical program in response to each operation selected for inclusion in the application, wherein the graphical program is separate from the application, and wherein each node is operable to perform the respective operation when the graphical program is executed.

16. The method of claim 15, wherein each node included in the graphical program in response to selecting an operation has an iconic appearance that is substantially identical to the icon corresponding to the operation.

17. The method of claim 15, further comprising:

removing a first operation from the application in response to user input; and automatically removing the node operable to perform the first operation from the graphical program in response to said removing the first operation from the application.

18. The method of claim 1, further comprising:

removing a first operation from the application in response to user input, wherein the first operation corresponds to a first icon; and automatically removing the first icon from the plurality of interconnected icons in response to said removing the first operation from the application, wherein the first icon is removed without user input selecting the first icon for removal.

19. The method of claim 1, wherein said including the plurality of operations in the application comprises receiving user input individually selecting each operation for inclusion in the application;

wherein the method further comprises executing each operation as the operation is selected for inclusion in the application.

20. The method of claim 1, further comprising:

executing each of the operations; and for each operation, displaying a result of said executing the operation, wherein said displaying the result of said executing the operation comprises displaying the result proximally to the icon that corresponds to the operation so that the result is visually associated with the icon.

21. The method of claim 20, wherein said executing each of the operations comprises executing a first operation to generate a pass/fail result, wherein the pass/fail result is displayed proximally to a first icon that corresponds to the first operation so that the pass/fail result is visually associated with the first icon.

22. The method of claim 21, wherein executing the first operation produces a fail result;

wherein displaying the pass/fail result proximally to the first icon that corresponds to the first operation comprises displaying information indicating the fail result;

wherein the method further comprises displaying information indicating a reason for the fail result.

23. The method of claim 20, wherein one or more of the plurality of operations in the application are operable to perform a test of a unit under test (UUT), wherein the UUT comprises a physical device;

wherein, for each operation operable to perform a test of the UUT, said displaying the result proximally to the icon that corresponds to the operation comprises displaying a pass/fail result proximally to the icon that corresponds to the operation.

24. The method of claim 1, further comprising:

for each operation, displaying a name of the operation together with the icon that corresponds to the operation.

25. The method of claim 1, further comprising:

displaying a graphical user interface that provides access to a set of operations; and receiving user input to the graphical user interface requesting inclusion of the plurality of operations in the application, wherein the plurality of operations are selected from the set of operations.

26. The method of claim 25, wherein said receiving user input to the graphical user interface requesting inclusion of the plurality of operations in the application does not include receiving user input specifying programming language code to implement the plurality of operations.

27. The method of claim 1, further comprising:

executing the application;

wherein said executing the application comprises executing the plurality of operations in the application to perform the first function.

28. The method of claim 27, further comprising:

highlighting execution of the interconnected icons on the display to visually indicate progression of execution of the operations in the application, wherein highlighting execution of the icons comprises changing visual appearances of the icons during execution of the application in order to visually indicate which operation is currently being executed.

29. The method of claim 27, wherein the plurality of operations comprises a plurality of machine vision operations, wherein the plurality of machine vision operations implement a machine vision function;

wherein the plurality of interconnected icons visually indicate the machine vision function;

wherein said executing the plurality of operations in the application comprises performing the machine vision function.

30. The method of claim 29,
wherein said performing the machine vision function includes one or more of:
acquiring one or more images; and
analyzing acquired images.

31. The method of claim 27,
wherein the plurality of operations comprises a plurality of motion control operations, wherein the plurality of motion control operations implement a motion control function;
wherein the plurality of interconnected icons visually indicate the motion control function;
wherein said executing the plurality of operations in the application comprises performing the motion control function.

32. The method of claim 31,
wherein said performing the motion control function includes one or more of:
controlling motion of a device; and
controlling a device to move an object.

33. The method of claim 27,
wherein the plurality of operations comprises a plurality of data acquisition (DAQ) operations, wherein the plurality of DAQ operations implement a DAQ function;
wherein the plurality of interconnected icons visually indicate the DAQ function;
wherein said executing the plurality of operations in the application comprises performing the DAQ function.

34. The method of claim 33,
wherein said performing the DAQ function includes acquiring measurement data from a DAQ device.

35. The method of claim 1, further comprising:
receiving user input for configuring one or more of the plurality of operations in the application;
wherein said receiving user input for configuring one or more of the plurality of operations in the application does not include receiving user input specifying programming language code to configure the operations;
wherein, for each operation, said configuring the operation affects functionality of the operation.

36. The method of claim 35, further comprising:
for each operation to be configured,
displaying a graphical panel including graphical user interface elements for setting properties of the operation; and
receiving user input to the graphical panel to set one or more properties of the operation.

37. The method of claim 1, further comprising:
displaying a text view of the plurality of operations in the application.

38. The method of claim 37,
wherein said displaying the text view of the plurality of operations in the application comprises displaying a table including text that specifies the plurality of operations in the application.

39. A computer-implemented method for displaying operations of an application, the method comprising:
including a first operation in the application in response to first user input;
automatically displaying a first icon corresponding to the first operation in response to said including the first operation in the application, wherein said automatically displaying the first icon comprises displaying the first icon without user input selecting the first icon;
including a second operation in the application in response to second user input; and
automatically displaying a second icon corresponding to the second operation in response to said including the second operation in the application, wherein said automatically displaying the second icon comprises displaying the second icon without user input selecting the second icon; and
automatically displaying a line directly connecting the first icon to the second icon, wherein said automatically displaying the line comprises displaying the line without user input specifying the line;
wherein the interconnected first icon and second icon form a block diagram visual representation of the application comprising the first and second operations, wherein the block diagram visual representation of the application appears substantially the same as a LabVIEW block diagram.

40. The method of claim 39, further comprising:
applying the first operation to an object in response to user input, wherein the first operation is included in the application in response to said applying the first operation to the object; and
applying the second operation to the object in response to user input, wherein the second operation is included in the application in response to said applying the second operation to the object.

41. The method of claim 39, further comprising:
applying the first operation to an object in response to said including the first operation in the application; and
applying the second operation to the object in response to said including the second operation in the application.

42. The method of claim 39,
wherein said including the first operation in the application in response to the first user input comprises including the first operation in a first application in response to the first user input, wherein the first user input is received to a second application;
wherein said including the second operation in the application in response to the second user input comprises including the second operation in the first application in response to the second user input, wherein the second user input is received to the second application;
wherein the first icon corresponds to a first node in a graphical programming development environment, wherein the graphical programming development environment is not the same as the second application; and
wherein the second icon corresponds to a second node in the graphical programming development environment.

43. The method of claim 39, further comprising:
displaying a graphical user interface which is useable for selecting the operations;
receiving said first user input to the graphical user interface selecting the first operation, wherein said including the first operation in the application is performed in response to said first user input;
receiving said second user input to the graphical user interface selecting the second operation, wherein said including the second operation in the application is performed in response to said second user input.

44. The method of claim 43,
wherein the graphical user interface displays an object;
wherein said first user input comprises applying the first operation to the object, wherein the first operation is included in the application in response to said applying the first operation to the object; and
wherein said second user input comprises applying the second operation to the object, wherein the second operation is included in the application in response to said applying the second operation to the object.

45. The method of claim 44, further comprising:

modifying the object on the display after each of said applying the first operation to the object and said applying the second operation to the object.

46. The method of claim 43, wherein the graphical user interface is displayed in a first window;

wherein the first icon and the second icon are displayed in a second window.

47. The method of claim 39, further comprising:

executing a prototyping environment, wherein said executing includes displaying a graphical user interface which is useable for selecting the operations;

wherein said first user input and said second user input are received to the graphical user interface of the prototyping environment.

48. A computer-implemented method for visually depicting an application which performs a function, the method comprising:

displaying an object on a display;

performing a first operation on the object in response to user input;

automatically displaying a first icon corresponding to the first operation in response to said performing the first operation on the object, wherein said automatically displaying the first icon comprises displaying the first icon without user input selecting the first icon;

performing a second operation on the object in response to user input;

automatically displaying a second icon corresponding to the second operation in response to said performing the second operation on the object, wherein said automatically displaying the second icon comprises displaying the second icon without user input selecting the second icon; and automatically displaying a line directly connecting the first icon to the second icon, wherein said automatically displaying the line comprises displaying the line without user input specifying the line;

wherein the interconnected icons appear substantially the same as a graphical data flow program.

49. The method of claim 48, wherein the interconnected icons visually indicate an ordering of execution of the first operation and the second operation.

50. The method of claim 48, wherein the first icon has an appearance corresponding to the first operation;

wherein the second icon has an appearance corresponding to the second operation.

51. The method of claim 48, wherein the first icon, the second icon, and the line displayed on the display operate to visually depict the first and second operations performed by the user.

52. The method of claim 48, further comprising:

including the first operation in the application in response to said performing the first operation on the object; and including the second operation in the application in response to said performing the second operation on the object.

53. The method of claim 48, wherein the first icon and the second icon originate from a graphical programming development environment.

54. The method of claim 48, wherein the first icon and the second icon are displayed in an order from left to right to visually indicate an ordering of the first operation and the second operation.

55. The method of claim 48, further comprising:

performing a third operation on the object in response to user input;

automatically displaying a third icon corresponding to the third operation in response to said performing the third operation on the object, wherein said automatically displaying the third icon comprises displaying the third icon without user input selecting the third icon;

automatically displaying a second line directly connecting the second icon to the third icon, wherein said automatically displaying the second line comprises displaying the second line without user input specifying the second line.

56. The method of claim 48, wherein the object is an image;

wherein the first operation and the second operation are image processing operations applied to the image.

57. A computer-implemented method for creating an application which performs a function, the method comprising:

displaying an object on a display;

performing a first operation on the object in response to user input;

automatically displaying a first icon corresponding to the first operation in response to said performing the first operation on the object, wherein the first icon is displayed without user input directly selecting the first icon;

performing a second operation on the object in response to user input; and automatically displaying a second icon corresponding to the second operation in response to said performing the second operation on the object, wherein the second icon is displayed without user input directly selecting the second icon.

58. The method of claim 57, wherein the first icon has an appearance corresponding to the first operation; and wherein the second icon has an appearance corresponding to the second operation.

59. The method of claim 57, further comprising:

storing information regarding the first operation in a data structure in response to said performing the first operation; and storing information regarding the second operation in the data structure in response to said performing the second operation.

60. A computer-implemented method for displaying operations of a machine vision application, the method comprising:

including a plurality of machine vision operations in the application in response to user input, wherein the plurality of machine vision operations implement a machine vision function;

automatically displaying a plurality of interconnected icons in response to said including the plurality of machine vision operations in the application, wherein each icon corresponds to a machine vision operation in the application, wherein the icons are displayed without user input directly selecting the icons, wherein the plurality of interconnected icons visually indicate the machine vision function, wherein said automatically displaying the plurality of interconnected nodes comprises automatically displaying connections among the nodes without user input creating the connections; and storing information representing the application in a data structure, wherein said storing the information comprises storing information specifying the plurality of machine vision operations in the application.

61. The method of claim 60, wherein said including the plurality of machine vision operations in the application comprises receiving user input individually selecting each machine vision operation for inclusion in the application, wherein for each of the machine vision operations, receiving the user input selecting the machine vision operation does not include receiving user input directly selecting the icon that corresponds to the machine vision operation.

62. The method of claim 60, wherein said including and said displaying comprise:

including a first machine vision operation in the application in response to user input, wherein a first icon corresponds to the first machine vision operation, wherein the first machine vision operation is included in the application without user input directly selecting the first icon;

automatically displaying the first icon corresponding to the first machine vision operation in response to said including the first machine vision operation in the application;

including a second machine vision operation in the application in response to user input, wherein a second icon corresponds to the second machine vision operation, wherein the second machine vision operation is included in the application without user input directly selecting the second icon;

automatically displaying the second icon corresponding to the second machine vision operation in response to said including the second machine vision operation in the application; and automatically displaying a connection between the first icon and the second icon, wherein said automatically displaying the connection comprises displaying the connection without user input specifying the connection.

63. The method of claim 60, wherein said automatically displaying the connections among the icons comprises automatically displaying a plurality of lines interconnecting the icons, wherein each line connects two icons.

64. The method of claim 63, wherein the plurality of lines includes a first line that connects a first icon to a second icon;

wherein the first line indicates that performing the machine vision function includes performing the machine vision operation corresponding to the first icon before performing the machine vision operation corresponding to the second icon.

65. The method of claim 63, wherein the plurality of lines includes a first line that connects a first icon to a second icon;

wherein the first line indicates that data produced by the machine vision operation corresponding to the first icon is used by the machine vision operation corresponding to the second icon.

66. The method of claim 60, wherein the plurality of interconnected icons appears substantially the same as a LabVIEW graphical program.

67. The method of claim 60, wherein said including the plurality of machine vision operations in the application in response to user input comprises including the plurality of machine vision operations in a first application in response to user input to a second application;

wherein each icon corresponds to a node in a graphical programming development environment, wherein the graphical programming development environment is not the same as the second application.

68. The method of claim 60, further comprising:

automatically generating a graphical program based on the application, wherein the graphical program is separate from the application;

wherein said automatically generating the graphical program comprises automatically including a plurality of interconnected nodes in the graphical program, wherein each node corresponds to a machine vision operation from the plurality of machine vision operations in the application, wherein the plurality of interconnected nodes are automatically included in the graphical program without user input specifying the plurality of interconnected nodes;

wherein the plurality of interconnected nodes in the graphical program implement the machine vision function.

69. The method of claim 68, wherein, for each node, the node has an iconic appearance that is identical to the icon corresponding to the machine vision operation to which the node corresponds.

70. The method of claim 68, wherein, for each node, the node has an iconic appearance that is substantially the same as the icon corresponding to the machine vision operation to which the node corresponds.

71. The method of claim 68, further comprising:

displaying the graphical program, wherein displaying the graphical program comprises displaying the plurality of interconnected nodes in the graphical program, wherein the plurality of interconnected nodes in the graphical program are displayed separately from the plurality of interconnected icons.

72. The method of claim 71, wherein the plurality of interconnected nodes in the graphical program appears identical to the plurality of interconnected icons.

73. The method of claim 71, wherein the plurality of interconnected nodes in the graphical program appears substantially the same as the plurality of interconnected icons.

74. The method of claim 71, wherein said displaying the plurality of interconnected icons comprises displaying the plurality of interconnected icons in a first window;

wherein said displaying the plurality of interconnected nodes in the graphical program comprises displaying the graphical program in a second window.

75. The method of claim 68, further comprising:

executing the graphical program;

wherein said executing the graphical program comprises executing the plurality of interconnected nodes to perform the machine vision function.

76. The method of claim 60, wherein said including the plurality of machine vision operations in the application comprises receiving user input individually selecting each machine vision operation for inclusion in the application;

wherein the method further comprises automatically including a node in a graphical program in response to each machine vision operation selected for inclusion in the application, wherein the graphical program is separate from the application, and wherein each node is operable to perform the respective machine vision operation when the graphical program is executed.

77. The method of claim 76, wherein each node included in the graphical program in response to selecting a machine vision operation has an iconic appearance that is identical to the icon corresponding to the machine vision operation.

78. The method of claim 76, wherein each node included in the graphical program in response to selecting a machine vision operation has an iconic appearance that is substantially the same as the icon corresponding to the machine vision operation.

79. The method of claim 76, further comprising:

removing a first machine vision operation from the application; and automatically removing the node operable to perform the first machine vision operation from the graphical program in response to said removing the first machine vision operation from the application.

80. The method of claim 60, wherein said including the plurality of machine vision operations in the application comprises receiving user input individually selecting each machine vision operation for inclusion in the application;

wherein the method further comprises executing each machine vision operation as the machine vision operation is selected for inclusion in the application.

81. The method of claim 60, further comprising:

executing each of the machine vision operations; and for each machine vision operation, displaying a result of said executing the machine vision operation, wherein said displaying the result of said executing the machine vision operation comprises displaying the result proximally to the icon that corresponds to the machine vision operation so that the result is visually associated with the icon.

82. The method of claim 81, wherein said executing each of the machine vision operations comprises executing a first machine vision operation to generate a pass/fail result, wherein the pass/fail result is displayed proximally to a first icon that corresponds to the first machine vision operation so that the pass/fail result is visually associated with the first icon.

83. The method of claim 82, wherein executing the first machine vision operation produces a fail result;

wherein displaying the pass/fail result proximally to the first icon that corresponds to the first machine vision operation comprises displaying information indicating the fail result;

wherein the method further comprises displaying information indicating a reason for the fail result.

84. The method of claim 81, wherein one or more of the plurality of machine vision operations in the application are operable to analyze an image of a unit under test (UUT);

wherein, for each machine vision operation operable to analyze an image of the UUT, said displaying the result proximally to the icon that corresponds to the machine vision operation comprises displaying a pass/fail result of the analysis proximally to the icon that corresponds to the machine vision operation.

85. The method of claim 80, further comprising:

displaying an image;

wherein said executing each machine vision operation comprises applying the machine vision operation to the displayed image;

wherein the method further comprises re-displaying the image after applying each machine vision operation to the image.

86. The method of claim 60, further comprising:

for each machine vision operation, displaying a name of the machine vision operation together with the icon that corresponds to the machine vision operation.

87. The method of claim 60, further comprising:

executing the application;

wherein said executing the application comprises executing the plurality of machine vision operations in the application to perform the machine vision function.

88. The method of claim 87, wherein said performing the machine vision function includes analyzing one or more images.

89. The method of claim 87, wherein said performing the machine vision function includes acquiring one or more images for analysis.

90. A computer-implemented method for displaying operations of a machine vision application, the method comprising:

including a first machine vision operation in the machine vision application;

automatically displaying a first icon corresponding to the first machine vision operation in response to said including the first machine vision operation in the machine vision application, wherein said automatically displaying the first icon comprises displaying the first icon without user input selecting the first icon;

including a second machine vision operation in the machine vision application; and automatically displaying a second icon corresponding to the second machine vision operation in response to said including the second machine vision operation in the machine vision application, wherein said automatically displaying the second icon comprises displaying the second icon without user input selecting the second icon; and automatically displaying a line connecting the first icon to the second icon, wherein said automatically displaying the line comprises displaying the line without user input specifying the line;

wherein the interconnected first icon and second icon form a visual representation of the machine vision application, wherein the visual representation of the machine vision application appears substantially the same as a LabVIEW block diagram.

91. The method of claim 90, further comprising:

displaying an image;

applying the first machine vision operation to the image in response to said including the first machine vision operation in the machine vision application; and applying the second machine vision operation to the image in response to said including the second machine vision operation in the machine vision application.

92. The method of claim 90, further comprising:

displaying an image;

applying the first machine vision operation to the image in response to user input, wherein the first machine vision operation is included in the machine vision application in response to said applying the first machine vision operation to the image; and applying the second machine vision operation to the image in response to user input, wherein the second machine vision operation is included in the machine vision application in response to said applying the second machine vision operation to the image.

93. The method of claim 90, wherein said including the first machine vision operation in the machine vision application comprises including the first machine vision operation in the machine vision application in response to user input received to a second application;

wherein said including the second machine vision operation in the machine vision application comprises including the second machine vision operation in the machine vision application in response to user input received to the second application;

wherein the first icon corresponds to a first node in a graphical programming development environment; wherein the graphical programming development environment is not the same as the second application; and wherein the second icon corresponds to a second node in the graphical programming development environment.

94. The method of claim 90, further comprising:

displaying a first result of executing the first machine vision operation proximally to the first icon so that the first result is visually associated with the first icon; and displaying a second result of executing the second machine vision operation proximally to the second icon so that the second result is visually associated with the second icon.

95. The method of claim 94, wherein said displaying the first result proximally to the first icon comprises displaying a first pass/fail result proximally to the first icon; and wherein said displaying the second result proximally to the second icon comprises displaying a second pass/fail result proximally to the second icon.

96. The method of claim 90, further comprising:

displaying a name of the first machine vision operation together with the first icon; and displaying a name of the second machine vision operation together with the second icon.

97. A computer-implemented method for creating an application which performs a machine vision function, the method comprising:

displaying an image on a display;

performing a first machine vision operation on the image in response to user input;

automatically displaying a first icon corresponding to the first machine vision operation in response to said performing the first machine vision operation on the image, wherein the first icon is displayed without user input directly selecting the first icon;

performing a second machine vision operation on the image in response to user input;

automatically displaying a second icon corresponding to the second machine vision operation in response to said performing the second machine vision operation on the image, wherein the second icon is displayed without user input directly selecting the second icon; and automatically displaying a connection between the first icon and the second icon, wherein said automatically displaying the connection comprises displaying the connection without user input creating the connection.

98. The method of claim 97, wherein the first icon, the second icon, and the connection appear substantially the same as a LabVIEW graphical program.

99. The method of claim 97, wherein the first icon, the second icon, and the connection have the appearance of a graphical data flow program.

100. The method of claim 97, wherein the first icon has an appearance corresponding to the first machine vision operation;

wherein the second icon has an appearance corresponding to the second machine vision operation.

101. The method of claim 97, wherein the first icon, the second icon, and the connection displayed on the display operate to visually depict the first and second machine vision operations performed in response to the user input.

102. The method of claim 97, further comprising:

including the first machine vision operation in the application in response to said performing the first machine vision operation on the image; and including the second machine vision operation in the application in response to said performing the second machine vision operation on the image.

103. The method of claim 97, wherein the first icon and the second icon originate from a graphical programming development environment that is different from an application used to create the application that performs the machine vision function.

104. The method of claim 97, wherein the first icon and the second icon are displayed in an order from left to right to visually indicate an ordering of the first machine vision operation and the second machine vision operation.

105. The method of claim 97, further comprising:

performing a third machine vision operation on the image in response to user input;

automatically displaying a third icon corresponding to the third machine vision operation in response to said performing the third machine vision operation on the image; and automatically displaying a second connection between the second icon and the third icon, wherein said automatically displaying the second connection comprises displaying the second connection without user input creating the second connection.

106. A computer-implemented method for creating an application which performs a machine vision function, the method comprising:

displaying an image on a display;

performing a first machine vision operation on the image in response to user input; automatically displaying a first icon corresponding to the first machine vision operation in response to said performing the first machine vision operation on the image, wherein the first icon is displayed without user input directly selecting the first icon;

performing a second machine vision operation on the image in response to user input; and automatically displaying a second icon corresponding to the second machine vision operation in response to said performing the second machine vision operation on the image, wherein the second icon is displayed without user input directly selecting the second icon.

107. The method of claim 106, wherein the first icon has an appearance corresponding to the first machine vision operation; and wherein the second icon has an appearance corresponding to the second machine vision operation.

108. The method of claim 1, wherein the plurality of interconnected icons appear substantially the same as a LabVIEW graphical data flow program.

109. The method of claim 1, wherein each connection comprises a single line segment directly connecting one of the icons to another of the icons.

110. The method of claim 1, wherein the icons are displayed without user input directly selecting the icons.

111. The method of claim 1, wherein said automatically displaying the plurality of interconnected icons comprises displaying the icons in a visual arrangement with respect to each other without user input directly specifying the visual arrangement.

* * * * *